United States Patent
Fujisawa

(10) Patent No.: US 9,280,278 B2
(45) Date of Patent: Mar. 8, 2016

(54) ELECTRONIC APPARATUS AND METHOD TO ORGANIZE AND MANIPULATE INFORMATION ON A GRAPHICAL USER INTERFACE VIA MULTI-TOUCH GESTURES

(75) Inventor: Eizo Fujisawa, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 13/387,488

(22) PCT Filed: Jul. 29, 2010

(86) PCT No.: PCT/JP2010/062853
§ 371 (c)(1),
(2), (4) Date: Jan. 27, 2012

(87) PCT Pub. No.: WO2011/013778
PCT Pub. Date: Feb. 3, 2011

(65) Prior Publication Data
US 2012/0131500 A1  May 24, 2012

(30) Foreign Application Priority Data
Jul. 29, 2009  (JP) ................................. 2009-177095

(51) Int. Cl.
G06F 3/0484 (2013.01)
G06F 3/0488 (2013.01)
G06F 3/0481 (2013.01)

(52) U.S. Cl.
CPC ........ G06F 3/04883 (2013.01); G06F 3/04817 (2013.01); *H04M 2250/22* (2013.01)

(58) Field of Classification Search
CPC ... G06F 3/0481; G06F 3/0488; G06F 3/0486; G06F 3/04845; G06F 3/0484; G06F 3/017; G06F 3/048
USPC .................................................. 715/800, 799
See application file for complete search history.

(56) References Cited

U.S. PATENT DOCUMENTS

| 5,861,886 A * | 1/1999 | Moran et al. .................. 715/863 |
| 8,392,849 B2 * | 3/2013 | Jung ............................. 715/837 |

(Continued)

FOREIGN PATENT DOCUMENTS

| JP | 2002149616 A | 5/2002 |
| JP | 2008234055 A | 10/2008 |
| JP | 2010040029 A | 2/2010 |

OTHER PUBLICATIONS

International Search Report and Written opinion for PCT/JP2010/062853 dated Oct. 12, 2010.

Primary Examiner — Jennifer To
Assistant Examiner — Terri Filosi
(74) Attorney, Agent, or Firm — Hauptman Ham, LLP

(57) ABSTRACT

According to an aspect, a portable electronic apparatus includes a display unit for displaying an image; an input detection unit for detecting contact with an area in which the image is displayed by the display unit as input; and a control unit for causing the display unit to display a plurality of item objects and a group object surrounding the item objects. If the input detection unit detects first input of coming into contact with two different points in an area in which the group object is displayed and moving the contact with at least one of the two different points in a direction away from the other while maintaining the contact, the control unit causes the display unit to display the item objects in an aligned manner in a direction in which the distance between the two points increases.

15 Claims, 14 Drawing Sheets

(56) References Cited

U.S. PATENT DOCUMENTS

| | | | |
|---|---|---|---|
| 2004/0117727 A1* | 6/2004 | Wada | 715/500 |
| 2008/0229222 A1 | 9/2008 | Kake | |
| 2010/0007623 A1* | 1/2010 | Kaneko | G06F 3/04883 345/173 |
| 2010/0107125 A1* | 4/2010 | Ockene et al. | 715/838 |
| 2010/0201634 A1* | 8/2010 | Coddington | 345/173 |

* cited by examiner

ELECTRONIC APPARATUS AND METHOD TO ORGANIZE AND MANIPULATE INFORMATION ON A GRAPHICAL USER INTERFACE VIA MULTI-TOUCH GESTURES

CROSS-REFERENCE TO RELATED APPLICATION

This application is a National Stage of PCT international application Ser. No. PCT/JP2010/062853 filed on Jul. 29, 2010 which designates the United States, and which is based upon and claims the benefit of priority from Japanese Patent Application No. 2009-177095, filed on Jul. 29, 2009.

FIELD

The present invention relates to a communication apparatus and a portable electronic apparatus that display an object serving as an image on a display device based on input on a touch panel, and to a control method for the portable electronic apparatus.

BACKGROUND

Communication apparatuses, such as a mobile phone and a PDA, have various types of input devices as well as an input device provided with buttons, such as a keyboard and a ten-key, as a device for receiving an instruction from a user. Patent Literature 1, for example, discloses a mobile terminal that detects the inclination of the mobile terminal and a gesture, such as "shaking" and "inclining", as input based on a signal acquired from an acceleration sensor.

CITATION LIST

Patent Literature

Patent Literature 1: Japanese Patent Application Laid-open No. 2002-149616

Technical Problem

As a device for receiving an instruction from a user, there has been developed a touch panel in which a user comes into contact with (touches) an area where an image is displayed so that the contact is detected as input. A communication apparatus including such a device allows the user to input an instruction to the communication apparatus intuitively. In a communication apparatus, when searching for some data from a plurality of pieces of data stored in a storage unit, the user may refine the search, align data (files), or rearrange the order of the data (files) by a predetermined standard.

If the user aligns the files or rearranges the order of the files, the user needs to input an instruction for aligning the files or the predetermined standard that is information required for rearranging the order of the files to the communication apparatus. In the conventional communication apparatus, however, the user cannot align the files by an intuitive operation, and cannot input the predetermined standard to the communication apparatus by an intuitive operation. As a result, the conventional communication apparatus does not sufficiently realize input of an instruction by an intuitive operation.

For the foregoing reasons, there is a need for a communication apparatus, a portable electronic apparatus, and a control method for the portable electronic apparatus that allows the user to organize information to be displayed on a display device by a more intuitive operation.

SUMMARY

According to an aspect, a communication apparatus includes a display unit for displaying an image; an input detection unit for detecting contact with an area in which the image is displayed by the display unit as input; a communication unit for performing communications with another terminal; and a control unit for causing the display unit to display a plurality of item objects each corresponding to communication data and a group object surrounding the item objects. If the input detection unit detects first input of coming into contact with two different points in an area in which the group object is displayed and moving the contact with at least one of the two different points in a direction away from the other while maintaining the contact, the control unit causes the display unit to display the item objects in an aligned manner in a direction in which the distance between the two points increases. If the input detection unit detects input of coming into contact with an area in which one of the item objects is displayed at a single contact point, the control unit causes the communication unit to perform communication processing based on communication data associated with the item object.

According to an aspect, a portable electronic apparatus includes a display unit for displaying an image; an input detection unit for detecting contact with an area in which the image is displayed by the display unit as input; and a control unit for causing the display unit to display a plurality of item objects and a group object surrounding the item objects. If the input detection unit detects first input of coming into contact with two different points in an area in which the group object is displayed and moving the contact with at least one of the two different points in a direction away from the other while maintaining the contact, the control unit causes the display unit to display the item objects in an aligned manner in a direction in which the distance between the two points increases.

According to another aspect, if the input detection unit detects the first input, the control unit cause the display unit to display the group object such that a shape of the group object is extended in the direction in which the distance between the two different points increases, and shrunk in a direction perpendicular to the direction in which the distance between the two points increases.

According to another aspect, if the input detection unit detects the first input, the control unit cause the display unit to display the item objects such that the item objects are aligned based on a predetermined standard and included in the group object.

According to another aspect, the control unit reverses an order of arrangement of the item objects between a case where contact with a first point that is one of the two different points is moved in a direction away from a second point that is the other of the two different points and a case where contact with the second point is moved in a direction away from the first point.

According to another aspect, the control unit rearranges the item objects based on different standards between a case where the direction in which the distance between the two different points increases is a first direction and a case where the direction is a second direction that is different from the first direction, and displays the item objects on the display unit such that the item objects are included in the group object.

According to another aspect, if the contact with the two different points is terminated in a state where the item objects are displayed on the display unit such that the item objects are aligned and included in the group object, and if the input detection unit detects second input of coming into contact with areas in which two item objects adjacent to each other among the item objects are displayed and moving the contact in directions away from each other while maintaining the contact with the areas in which the item objects are displayed, the control unit displays the group object in a manner divided into two by a boundary between the two item objects.

According to another aspect, if the input detection unit detects third input of coming into contact with areas in which a first item object and a second item object arranged with at least one item object interposed therebetween among the item objects are displayed in a state where the item objects are displayed in an aligned manner on the display unit, and moving the contact in directions away from each other while maintaining the contact with each of the item objects, the control unit displays the group object in a manner divided into three of a first group object including the first item object, a second group object including the second item object, and an intermediate group object including the item object arranged intermediately by a first boundary between the first item object and the item object arranged intermediately and by a second boundary between the second item object and the item object arranged intermediately.

According to another aspect, when displaying the group object in a divided manner, the control unit causes the display unit to display the item objects without aligning the item objects.

According to another aspect, if the input detection unit detects input of coming into contact with an area in which one of the item objects is displayed at a single contact point, the control unit performs processing associated with the item object.

According to an aspect, a control method for a portable electronic apparatus is a control method for a portable electronic apparatus including a display unit that displays an image and an input detection unit that detects a touch to an area in which the image is displayed by the display unit. The control method includes displaying a plurality of item objects and a group object surrounding the item objects on the display unit; detecting, by the input detection unit, first input of touching two different points in an area in which the group object is displayed and sweeping a touch to at least one of the two different points in a direction away from the other while maintaining touches to the two points; and displaying, when the first input is detected, the item objects in an aligned manner in a direction in which the distance between the two points increases on the display unit.

Advantageous Effects of Invention

With a communication apparatus, a portable electronic apparatus, and a control method for the portable electronic apparatus according to the present invention, it is possible to organize information to be displayed on a display device by a more intuitive operation.

DESCRIPTION OF EMBODIMENTS

Exemplary embodiments according to the present invention are described below in greater detail with reference to the accompanying drawings. It is to be noted that the present invention is not limited by the following explanation. Components in the description below include components that are easily thought of by those skilled in the art and components that are substantially identical, that is, components within a so-called equivalent scope. In the description below, a portable electronic apparatus, more specifically, a mobile phone will be explained as an example of a communication apparatus. However, a target to which the present invention is applied is not limited to the mobile phones. The present invention can also be applied to, for example, personal handyphone systems (PHSs), PDAs, portable navigation devices, notebook computers, and gaming devices.

Figure 1:
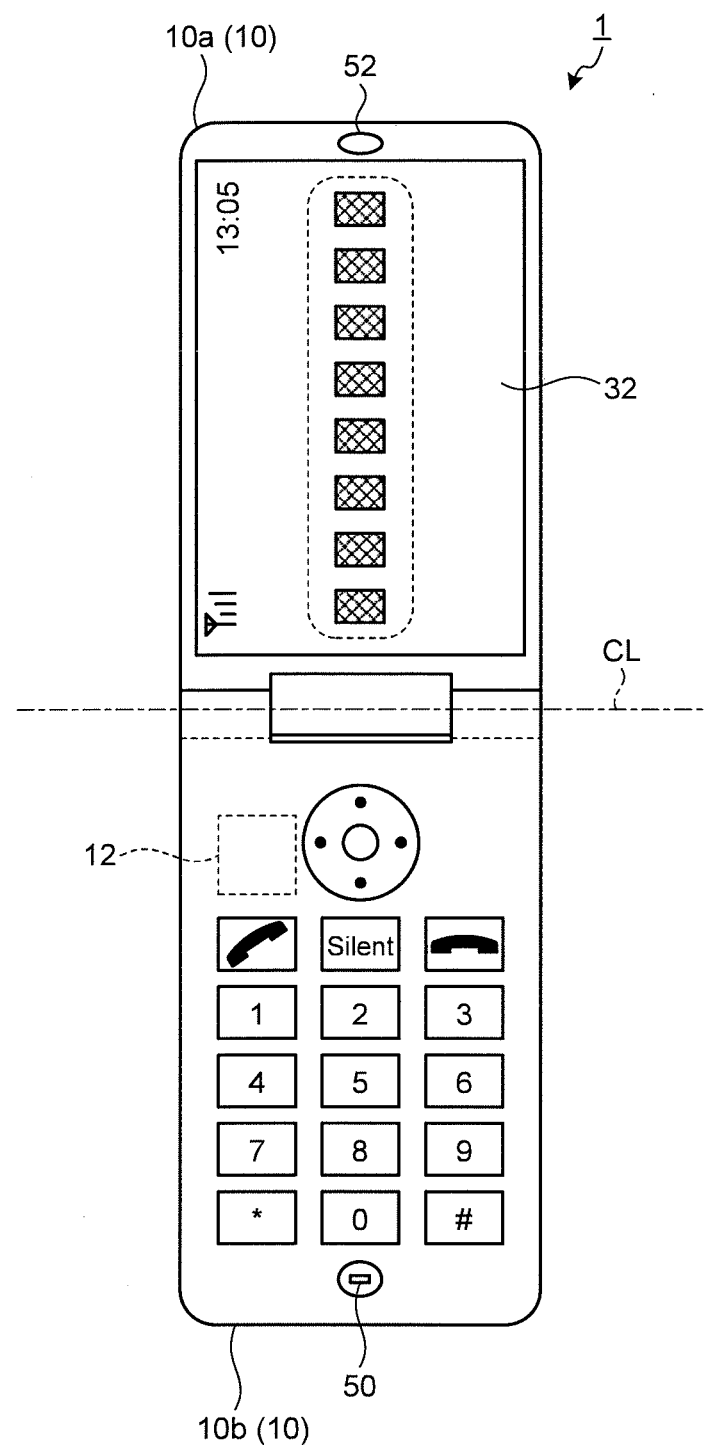
FIG. 1 is a front view of a portable electronic apparatus.

FIG. 1 is a front view of a portable electronic apparatus. As illustrated in FIG. 1, the portable electronic apparatus 1 is formed with the main components housed in a housing 10. The housing 10 includes a first housing 10a and a second housing 10b, for example. The first housing 10a is connected to the second housing 10b in a rotatable manner about an axis CL. The portable electronic apparatus 1 is a so-called flip mobile phone. The portable electronic apparatus 1 is not limited to the flip mobile phone. The portable electronic apparatus 1 may be formed with the first housing 10a connected to the second housing 10b in a slidable manner, or formed of a single housing.

Figure 2:
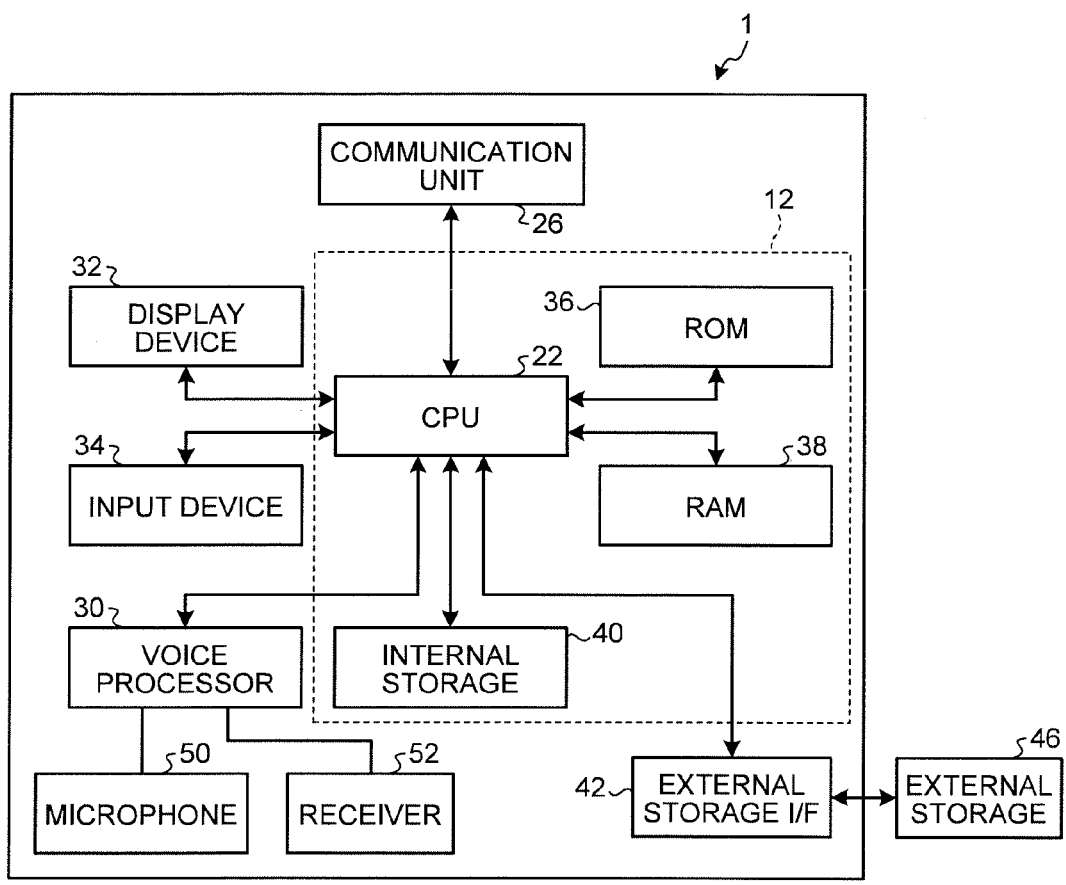
FIG. 2 is a block diagram of a schematic configuration of the portable electronic apparatus.

FIG. 2 is a block diagram of a schematic configuration of the portable electronic apparatus. As illustrated in FIG. 2, the portable electronic apparatus 1 includes a control device 12 serving as a control unit, a communication unit 26, a voice processor 30, a display device 32 serving as a display unit, an input device 34 serving as an input detection unit, and an external storage interface (I/F) 42. The portable electronic apparatus 1 can be connected to an external storage 46 that is attachable and detachable. In addition to the components described above, the portable electronic apparatus 1 includes various types of components provided to a portable electronic apparatus, such as an image capturing unit and various types of terminals.

The control device 12 includes a central processing unit (CPU) 22, a read-only memory (ROM) 36, a random access memory (RAM) 38, and an internal storage 40, for example. The control device performs a control method for the portable electronic apparatus according to the present embodiment. The CPU 22 is a processing unit that controls entire operations of the portable electronic apparatus 1 integrally. The CPU 22 controls operations of the communication unit 26, the display device 32, and the like such that various types of processing in the portable electronic apparatus 1 is performed in a proper process based on an operation input by a user via the input device 34 and software stored in the ROM 36 and the internal storage 40 of the portable electronic apparatus 1. The various types of processing in the portable electronic apparatus 1 includes a voice call made via a line switching network, composition and transmission and reception of an e-mail, and browsing of a World Wide Web (Web) page on the internet, for example. The operations of the communication unit 26, the voice processor 30, and the display device 32 correspond to transmission and reception of a signal performed by the communication unit 26, input and output of voice performed by the voice processor 30, and display of an image performed by the display device 32, respectively, for example.

The CPU 22 performs processing based on computer programs stored in the ROM 36 and the internal storage 40. The computer programs include an operating system program, and an application program, for example. The CPU 22 is formed of a micro-processor unit (MPU), for example, and performs the various types of processing in the portable electronic apparatus 1 in accordance with a process instructed by the software. In other words, the CPU 22 reads an instruction code sequentially from the operating system program, the application program, and the like stored in the ROM 36 and the internal storage 40, thereby performing the processing.

The CPU 22 can execute a plurality of application programs. The application programs executed by the CPU 22 are a plurality of application programs including an image display application program that displays an image on the display device 32, an operation detection application program that calculates an input operation based on input detected by the input device 34, a search application program that performs search refinement, an Internet application program that performs communications over the Internet, an e-mail application program that creates an e-mail, and a telephone application program for making a phone call, for example.

The communication unit 26 establishes a wireless signal path by a CDMA system or the like with a base station via a channel allocated by each base station, and performs telephone communications and information communications with the base station. The communication unit 26 includes an antenna and a device for amplifying a signal received by the antenna, for example.

The voice processor 30 performs processing of an audio signal input to a microphone 50 and an audio signal output from a receiver 52. As illustrated in FIG. 1, for example, the microphone 50 is housed in the second housing 10b. As illustrated in FIG. 1, the receiver 52 is housed in the first housing 10a. The voice processor 30 illustrated in FIG. 2 amplifies voice received from the microphone 50, performs analog digital conversion (AD conversion) on the voice, and performs signal processing such as encoding on the voice. Thus, the voice processor 30 converts the voice received from the microphone 50 into digital audio data, and outputs the digital audio data to the CPU 22. Furthermore, the voice processor 30 performs processing, such as decoding, digital analog conversion (DA conversion), and amplification, on audio data transmitted from the CPU 22. Thus, the voice processor 30 converts the audio data transmitted from the CPU 22 into an analog audio signal, and outputs the analog audio signal to the receiver 52.

The display device 32 includes a display panel, such as a liquid crystal display (LCD) and an organic electro-luminescence (EL) panel. The display device 32 displays video corresponding to video data supplied from the CPU 22 and an image corresponding to image data supplied therefrom on the display panel. As illustrated in FIG. 1, for example, the display device 32 is provided to the first housing 10a. An image displayed on the display device 32 will now be described.

Figure 3:
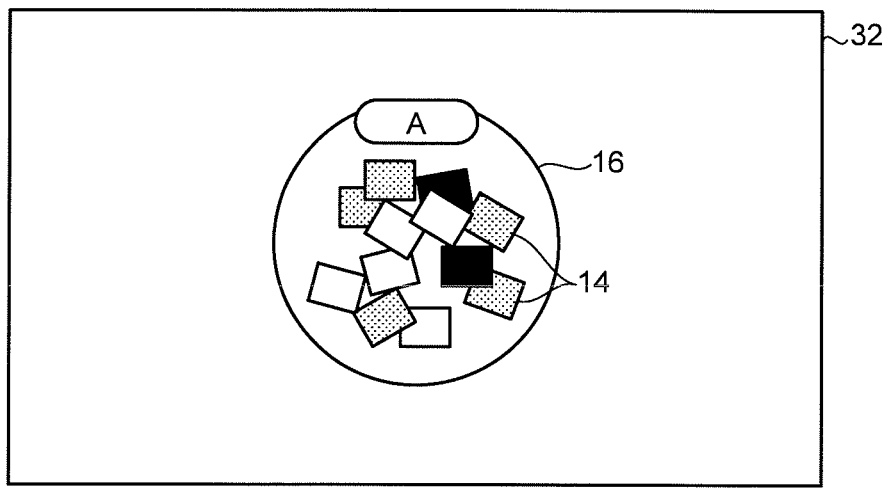
FIG. 3 is a view for explaining an example of an image displayed on a display device.

FIG. 3 is a view for explaining an example of an image displayed on the display device. As illustrated in FIG. 3, the display device 32 displays an item object 14 and a group object 16. An object used herein means an image indicating a file or a folder that may be a target of an operation performed by the user. The item object 14 is an image corresponding to various types of files. The image corresponding to each file is an image corresponding to an image file, a music and audio file, a moving image file, a text file, and a file storing therein data of an address book in which e-mail addresses and phone numbers are written, for example. The group object 16 is an image representing a group composed of a plurality of item objects 14.

The group object 16 is a so-called folder (directory). The group object 16 includes, in addition to a folder created by the user, a folder created by the portable electronic apparatus 1 in association with search refinement and a folder temporarily created in order to manage a group of files searched by the search refinement. The display device 32 can display a key object in addition to the group object 16 and the item objects 14 illustrated in FIG. 3. The key object is an object serving as search criteria used for performing search refinement on the item objects 14.

The input device 34 illustrated in FIG. 2 is a touch panel provided on the user side of the surface of the display device 32 and arranged in a manner covering the display device 32. When the user comes into contact with the surface of the input device 34, the input device 34 detects the contact (touch) as input. The input device 34 detects the position, the magnitude, and the like of the contact. The input device 34 is a touch panel of a matrix switch, a resistance film type, a surface acoustic wave type, an infrared type, an electromagnetic induction type, a capacitive type, and the like.

The input device 34 according to the present embodiment is a so-called multi-touch panel capable of detecting a plurality of contact points at which the user comes into contact with the input device 34. In a state where images of keys to which various types of functions are allocated, such as a power key, a talk key, a numeric key, a character key, a direction key, an OK key, a calling key, and the like are displayed on the display device 32, for example, if the user operates the input device 34, the input device 34 detects the position of the contact point between the user and the input device 34. The portable electronic apparatus 1 then determines that an operation of a key corresponding to the position at which the input device 34 detects the contact is input, and thus the CPU 22 performs processing for realizing the function allocated to the key.

The ROM 36 is a read-only storage device. The ROM 36 stores therein firmware, such as BIOS, used for driving the portable electronic apparatus 1. The RAM 38 is a readable and writable storage device. The RAM 38 is formed of a static random access memory (SRAM) or a dynamic random access memory (DRAM), for example. In the portable electronic apparatus 1, the ROM 36 and the RAM 38 constitute the main memory. The CPU 22 allocates a computer program and temporary data used in a processing process of software to the ROM 36 and the RAM 38. The ROM 36 and the RAM 38 store the data thus allocated in a work area temporarily.

The internal storage 40 is provided in the housing 10 of the portable electronic apparatus 1. The internal storage 40 is a readable and writable storage device. The internal storage 40 is a hard disk, for example, and is used as an auxiliary storage device. The internal storage 40 stores therein software and data used for processing in the CPU 22. The internal storage 40 also stores therein information for configuring various types of folders, such as an image folder for saving transmitted or downloaded image data, a wallpaper image folder for saving an image file used for a wallpaper image, and a media folder of saving a media file for music, a moving image, and the like. Furthermore, the internal storage 40 stores therein software used by the CPU 22 for controlling the internal storage 40, an address book composed of phone numbers, e-mail addresses, and the like of intended parties, an audio file, such as a dial tone and a ringtone, temporary data used in a processing process of software, and the like.

The external storage I/F 42 is a terminal for connecting the external storage 46 that is attachable and detachable with the portable electronic apparatus 1. Connecting the external storage 46 to the external storage I/F 42 allows the portable electronic apparatus 1 to transmit and receive data between the CPU 22 and the external storage 46. The external storage 46 is a so-called external memory. The external storage 46 is a storage device that is attachable and detachable to and from the portable electronic apparatus 1 via the external storage I/F 42. The external storage 46 is a memory card, such as an SD card and a Compact Flash (registered trademark), or an external hard disk, for example. The basic configuration of the portable electronic apparatus 1 has been explained above. Various functions realized by the control device 12 will now be explained.

Figure 4:
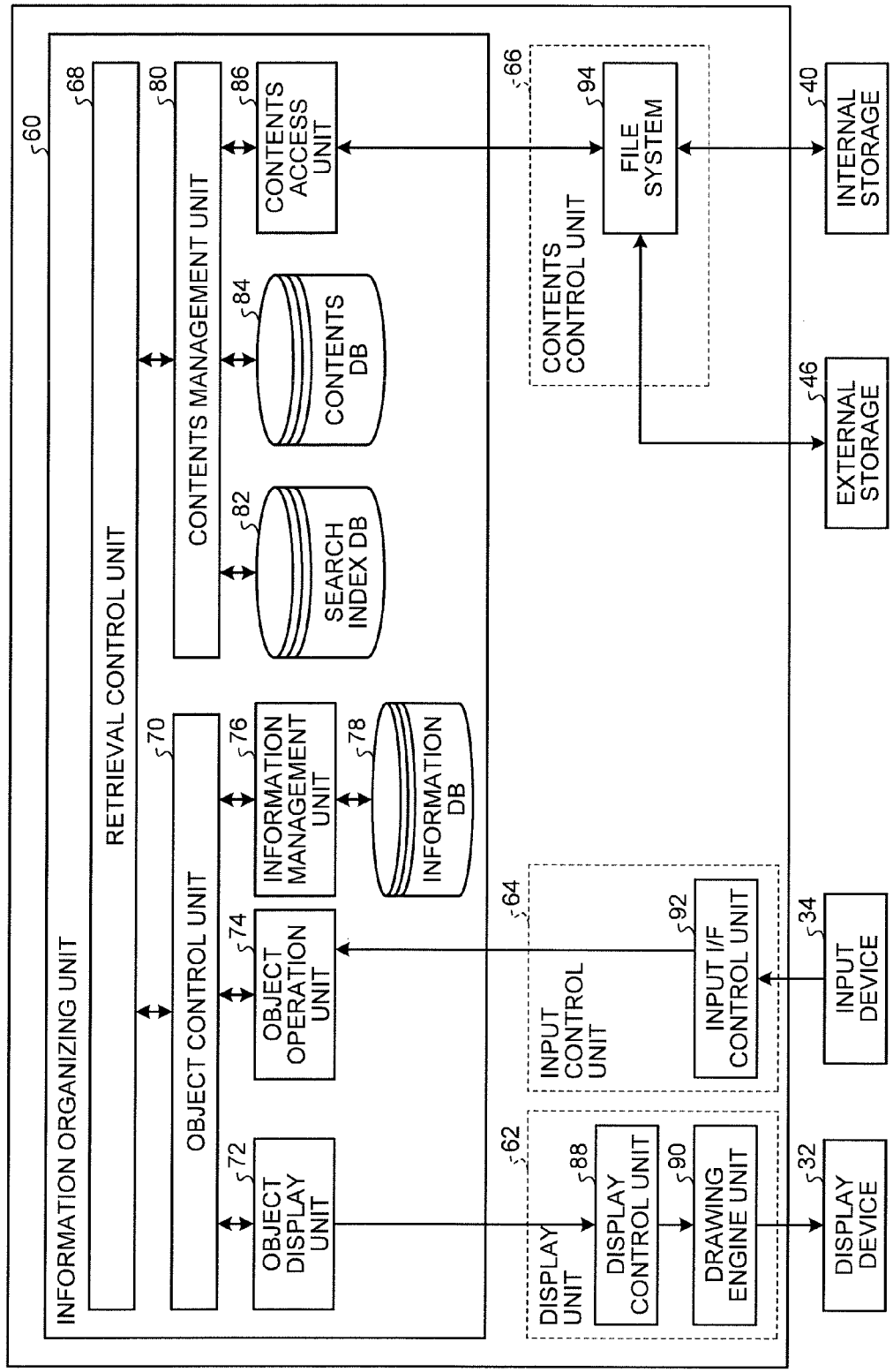
FIG. 4 is a block diagram for explaining each function of a control device.

FIG. 4 is a block diagram for explaining various functions of the control device. Specifically, these functions illustrated in FIG. 4 are realized by the CPU 22 illustrated in FIG. 2 executing predetermined software (computer program).

As illustrated in FIG. 4, the control device 12 includes an information organizing unit 60, a display unit 62, an input control unit 64, and a contents control unit 66. The information organizing unit 60 searches for required information from a plurality of pieces of information, and rearranges the order of the information, thereby organizing the information. The display unit 62 changes images displayed on the display device 32. The input control unit 64 acquires information detected by the input device 34. The contents control unit 66 transmits and receives data to and from the internal storage 40 and the external storage 46. A configuration of each unit will be explained.

The information organizing unit 60 includes a retrieval control unit 68, an object control unit 70, an object display unit 72, an object operation unit 74, an information management unit 76, an information database 78, a contents management unit 80, a search index database 82, a contents database 84, and a contents access unit 86. The retrieval control unit 68 reads the group object 16, and calculates the relevance ratio of each of the item objects 14 in the group object 16 to search criteria. The retrieval control unit 68 then extracts an item object 14 whose relevance ratio satisfies a condition, that is, an item object 14 whose relevance ratio is within a given range from the item objects 14 in the group object 16, thereby performing search refinement. In the present embodiment, for example, the retrieval control unit 68 performs the extraction in descending order of the relevance ratio, thereby extracting the item object 14 whose relevance ratio falls within a range from 100% to a given ratio.

The retrieval control unit 68 transmits and receives information to and from the object control unit 70 and the contents management unit 80, and performs the search refinement on the item objects 14 based on the information supplied from the units. The object control unit 70 transmits and receives information to and from the object display unit 72, the object operation unit 74, and the information management unit 76, and controls behavior of various objects, such as the group object 16, the item object 14, and the key object. Specifically, the object control unit 70 selects an object to be displayed, determines the position at which the object is to be displayed, and creates new group object 16 based on determination of the retrieval control unit 68. The object control unit 70 also determines which group object 16 each of the item objects 14 belongs to, moves each of the item objects 14 thereto, and generates the key object, for example.

The object display unit 72 transmits the information of the object to be displayed that is determined based on the control performed by the object control unit 70 to a display control unit 88 of the display unit 62. In other words, the object display unit 72 transmits the information on which group object 16 is to be displayed, which item object 14 is to be displayed, and which key object is to be displayed, and the information on where and how each of the objects is displayed to the display control unit 88.

The object operation unit 74 determines an object to be operated and operation of the object based on an input signal transmitted from the input control unit 64. The object operation unit 74 then transmits a signal of the object to be operated thus determined and a signal of the operation thus determined to the object control unit 70.

The information management unit 76 realizes a function to manage information on each of the objects, the position of the contact point between the user and the input device 34 acquired from the input device 34 via the input control unit 64, and the like. The information database 78 is a storage unit that stores therein the information on each of the objects and the position information of the contact point. As the information on each of the objects, various types of information required for search refinement and an operation of each of the objects is stored. The various types of information includes information indicating which group object 16 each of the item objects 14 belongs to, information used for calculating the relevance ratio of each of the objects in the search refinement, and information of the key object. The information database 78 stores therein information on each of the objects displayed on a screen of the display device 32. The information management unit 76 reads the information in the information database 78 as necessary, and transmits the information to the object control unit 70. If the information on each of the objects is updated, the information management unit 76 updates the information stored in the information database 78.

The contents management unit 80 includes the search index database 82, the contents database 84, and the contents access unit 86. The contents management unit 80 reads a file of photos, music data, data of an address book, and the like stored in the internal storage 40 and the external storage 46 via the contents control unit 66. Furthermore, the contents management unit 80 writes each file in the internal storage 40 and the external storage 46.

The search index database 82 stores therein information on the search criteria used for search refinement. The search index database 82 also stores therein, as needed, information on search criteria in addition to the information on the search criteria displayed as the key object on the screen of the display device 32.

The contents database 84 stores therein audio data, an image file, and data for a Web page and the like, each of which serves as the item object 14. In other words, the contents database 84 stores therein information of a file (audio information and image information) corresponding to the item object 14 displayed on the screen. The contents database 84 also stores therein information of a file of another item object in addition to those of the item objects 14 displayed on the display device 32. The contents access unit 86 transmits and receives information to and from the contents control unit 66. The contents access unit 86 reads information of a file, software, and the like acquired by the contents control unit 66, and transmits information of a file and software transmitted from the contents management unit 80 to the contents control unit 66.

The display unit 62 includes the display control unit 88 and a drawing engine unit 90. The display unit 62 generates an image signal of an image to be displayed on the display device 32 based on the information transmitted from the object display unit 72 of the information organizing unit 60, and transmits the image signal to the display device 32. The display control unit 88 creates the image to be displayed based on the information transmitted from the object display unit 72, that is, the information on which object is to be displayed at which position and in which manner. The drawing engine unit 90 converts the image created by the display control unit 88 into an image signal, and transmits the image signal thus converted to the display device 32. Thus, the display device 32 displays the image created by the display unit 62 based on the information transmitted from the information organizing unit 60. If other software is activated, the display unit 62 creates the image based on information transmitted from various types of software as well as on the information transmitted from the object display unit 72.

The input control unit 64 includes an input I/F control unit 92. The input control unit 64 transmits an operation by the user that is detected by the input device 34 to the object operation unit 74. The input I/F control unit 92 converts a signal transmitted from the input device 34 into a signal capable of being analyzed in the information organizing unit 60, and transmits the signal to the object operation unit 74.

The contents control unit 66 includes a file system 94. The contents control unit 66 reads information from the internal storage 40 and the external storage 46, and transmits the information thus read to the contents access unit 86. Furthermore, the contents control unit 66 writes information transmitted from the contents access unit 86 in the internal storage 40 and the external storage 46. The file system 94 is a function to manage reading and writing of information.

The portable electronic apparatus 1 according to the present embodiment has a characteristic in reducing burden on the user when the user organizes the objects displayed on the display device 32. In a conventional portable electronic apparatus, for example, if the user organizes a plurality of pieces of information displayed on a display device, the user needs to perform a so-called drag operation of moving an image (icon), corresponding to the object in the present embodiment, to an arbitrary position with the image being in a selected state. In the conventional art, the user performs the operation on a plurality of images corresponding to the objects in the present embodiment repeatedly, thereby aligning the images. Alternatively, the user needs to operate a menu button displayed on the display device 32, and to select a button for aligning the images (icons). In this case, however, the images are aligned in a predetermined direction. Therefore, if the user desires to align the images in a desired direction, the user needs to repeat the drag described above to move the images.

The portable electronic apparatus 1 according to the present embodiment has a characteristic in organizing the item objects 14 displayed on the display device 32 by an intuitive operation performed by the user. An explanation will be made of an example of the operation performed by the user on the portable electronic apparatus 1 in order to align the item objects 14 displayed on the display device 32.

Figure 5A:
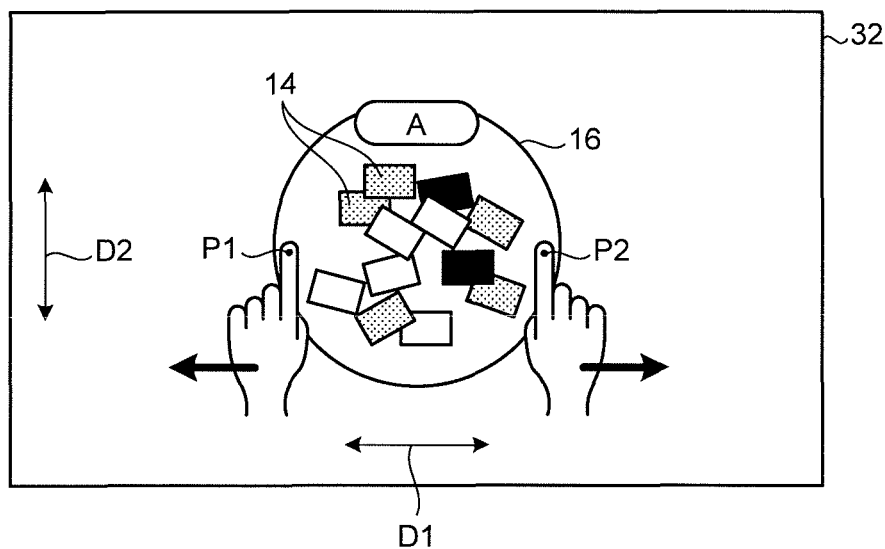
FIG. 5A is a view for explaining the image displayed on the display device in an initial state.
Figure 5B:
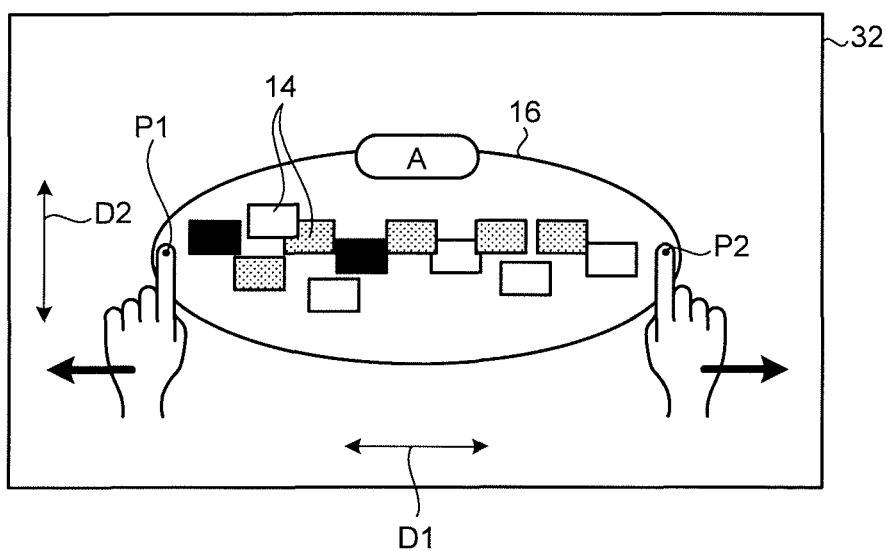
FIG. 5B is a view for explaining the image displayed on the display device when item objects are being aligned.
Figure 5C:
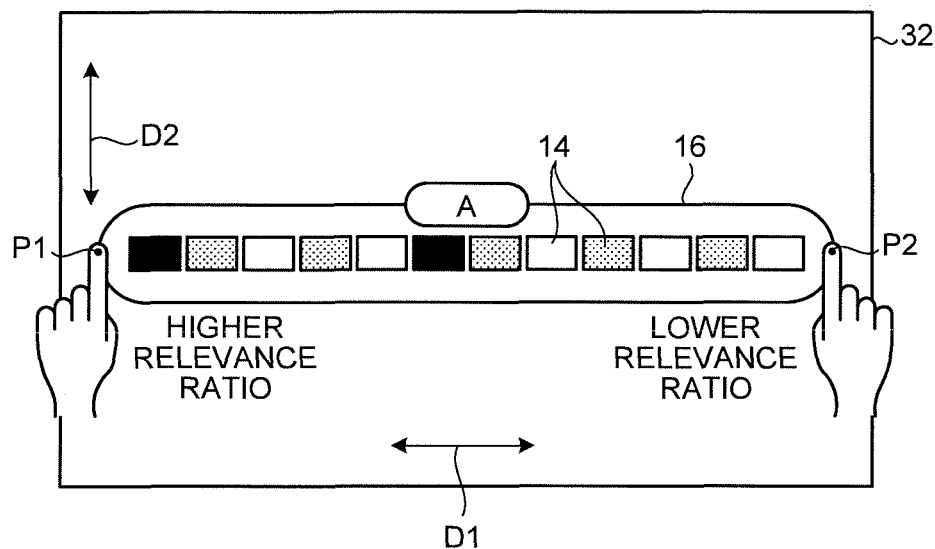
FIG. 5C is a view for explaining the image displayed on the display device when the alignment of the item objects is completed.
Figure 5D:
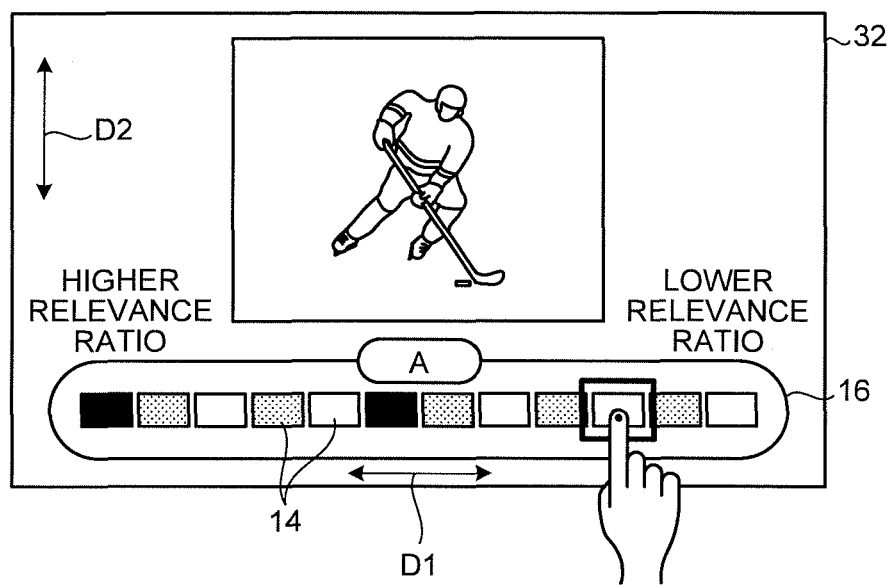
FIG. 5D is a view for explaining the image displayed on the display device when a preview is displayed.

FIG. 5A is a view for explaining the image displayed on the display device in an initial state. FIG. 5B is a view for explaining the image displayed on the display device when the item objects are being aligned. FIG. 5C is a view for explaining the image displayed on the display device when the alignment of the item objects is completed. FIG. 5D is a view for explaining the image displayed on the display device when a preview is displayed.

An explanation will be made of the case where each of the item objects 14 corresponds to an image file as an example in which the user organizes the item objects 14. The item object 14 illustrated in FIG. 5A to FIG. 5D is a thumbnail image (an image obtained by reducing the size of an original image) of an image file corresponding to each of the item objects 14, for example. It is to be noted that the item object 14 is not limited to the image file. The item object 14 may be an image corresponding to an image file, a music and audio file, a moving image file, a text file, a file storing therein data of the address book in which e-mail addresses and phone numbers are written, and the like.

As illustrated in FIG. 5A, the control device 12 displays the item objects 14 arranged randomly and the group object 16 surrounding the item objects 14 on the display device 32 as an initial state. In this case, the shape of the group object 16 is a circle, for example. One direction on the surface of an area in which the image is displayed on the display device 32 is represented as a first direction D1, whereas a direction different from the first direction D1 is represented as a second direction D2. The first direction D1 and the second direction D2 are orthogonal to each other, for example. In the case of the display device 32 illustrated in FIG. 5A to FIG. 5D, the first direction D1 is a horizontal direction viewed from the user, whereas the second direction D2 is a vertical direction viewed from the user. In the present embodiment, while the shape of the group object 16 in the initial state is a circle, the shape of the group object 16 in the initial state is not limited to a circle. The shape of the group object 16 in the initial state may be a polygon as long as it is a shape surrounding the item objects 14 arranged randomly. In the present embodiment, the size of the group object 16 in the first direction D1 and the size thereof in the second direction D2 are approximately in a ratio of one to one.

When aligning the item objects 14 arranged randomly, the user inputs an operation (first input) of stretching the group object 16 in an arbitrary direction to the input device 34 as illustrated in FIG. 5A. In other words, the user inputs an operation of increasing the distance between two different points in the group object 16 to the input device 34. The two different points described above are represented as a first point P1 and a second point P2. Specifically, when increasing the distance between the first point P1 and the second point P2, the user comes into contact with the two different points in the area in which the group object 16 is displayed. Subsequently, the user moves his or her fingers so as to increase the distance between the first point P1 and the second point P2 while maintaining the contact.

Depending on methods employed for the input device 34, the point at which the user comes into contact with the input device 34 may not be coincident with the first point P1 or the second point P2 in the group object 16. Therefore, even if the user comes into contact with a point on the input device 34 slightly outside of the area in which the group object 16 is displayed, for example, the point at which the user comes into contact with the input device 34 may be recognized as a point in the group object 16. The user, for example, moves (sweeps) the first point P1 in a direction away from the second point P2, and moves the second point P2 in a direction away from the first point P1. This causes the distance between the first point P1 and the second point P2 to increase as illustrated in FIG. 5B. The direction in which the distance between the first point P1 and the second point P2 increases is coincident with the first direction D1. In other words, the user inputs an operation of stretching the group object 16 in the first direction D1 to the input device 34.

The object display unit 72 arranges the item objects 14 in the direction in which the distance between the first point P1 and the second point P2 increases, that is, in the first direction D1. In the present embodiment, as the distance between the first point P1 and the second point P2 increases, the object display unit 72 arranges the item objects 14 in a more aligned manner in the first direction D1. In other words, as the distance between the first point P1 and the second point P2 increases, the object display unit 72 reduces variation in the item objects 14 in the second direction D2, and displays the item objects 14 on the display device 32.

The object display unit 72 also stretches the shape of the group object 16 in the direction in which the distance between the first point P1 and the second point P2 increases, that is, in the first direction D1. Specifically, the object display unit 72 extends the group object 16 in the first direction D1, and shrinks the group object 16 in the second direction D2. At this time, the group object 16 is extended in the first direction D1 by the length equal to (in proportion to) the length of movement of the contact positions. At this time, the group object 16 is also shrunk in the second direction D2 in inverse proportion to the length of movement of the contact positions. This makes the size of the group object 16 in the first direction D1 larger than that in the second direction D2. In the present embodiment, as the distance between the first point P1 and the second point P2 increases, the object display unit 72 makes the size of the group object 16 in the first direction D1 larger than the current size, and makes the size of the group object 16 in the second direction D2 smaller than the current size. In other words, as the distance between the first point P1 and the second point P2 increases, the object display unit 72 increases the ratio of the size of the group object 16 in the first direction D1 to that in the second direction D2.

The group object 16 only needs to be in a shape including all the item objects 14 aligned in the first direction D1. Therefore, the object display unit 72 may extend the group object 16 both in the first direction D1 and the second direction D2. However, if the object display unit 72 extends the group object 16 only in the first direction D1, the user can acquire a greater sense that he or she is aligning the item objects 14 by extending the group object 16. Therefore, if the object display unit 72 extends the group object 16 only in the first direction D1, it is possible to further realize alignment of the item objects 14 by a more intuitive operation performed by the user.

If the first input of increasing the distance between the first point P1 and the second point P2 is input to the input device 34, and the variation in the item objects 14 in the second direction D2 reaches 0, the display device 32 displays the item objects 14 in a line in the first direction D1 as illustrated in FIG. 5C. The group object 16 is extended in the first direction D1 to be in a shape surrounding the item objects 14 arranged in a line.

Depending on the number of the item objects 14, the item objects 14 may fail to be displayed in a line on the display device 32. In this case, for example, the object display unit 72 may arrange the item objects 14 in a plurality of lines in the first direction D1. Alternatively, the object display unit 72 may reduce the size of each of the item objects 14 to a size in which the item objects 14 can be displayed in a line on the display device 32. Still alternatively, the object display unit 72 may display a scroll bar on the display device 32, and move the item objects 14 in the first direction D1 when the user operates the scroll bar. In this case, the object display unit 72 sequentially displays the item objects 14 arranged in a line on the display device 32 while scrolling the item objects 14 in accordance with the operation performed by the user.

The object display unit 72 can sequentially display the item objects 14 arranged in a line on the display device 32 while scrolling the item objects 14 without providing the scroll bar described above. If the input device 34 detects input of moving a point in the group object 16 in the first direction D1, for example, the object display unit 72 moves the item objects 14 in the first direction D1. With this configuration, the object display unit 72 sequentially displays the item objects 14 arranged in a line on the display device 32 while scrolling the item objects 14.

As described above, the user inputs an operation of extending the group object 16 in the first direction D1 to the input device 34, whereby the portable electronic apparatus 1 displays the item objects 14 in a manner aligned in the first direction D1 on the display device 32. Thus, the portable electronic apparatus 1 can display the item objects 14 displayed on the display device 32 in an aligned manner by an intuitive operation performed by the user. In the state where the item objects 14 are aligned, if the user comes into contact with an area corresponding to an area in which one of the item objects 14 is displayed on the touch panel to select one of the item objects 14, the display unit 62 may display a preview of the item object 14 thus selected on the display device 32 as illustrated in FIG. 5D. The user comes into contact with an area in which a desired item object 14 is displayed among the areas in which the item objects 14 are displayed, thereby selecting one point on the desired item object 14 by single contact. With this operation, the input control unit 64 determines that one of the item objects 14 is selected.

In the case where the item objects 14 are music files, for example, if the user selects one of the item objects 14, the control device 12 plays music corresponding to the item object 14 thus selected. At this time, the control device 12 causes the display unit 62 to display images of buttons of a music player on the display device 32. The buttons of the player include a start button, a stop button, a fast-forward button, a rewind button, and a repeat button. Furthermore, the control device 12 may cause the contents management unit 80 to read information of the music file from the contents database 84, and cause the display unit 62 to display the information on the display device 32. The information of the music file includes current played time, the length of the entire played time, the name of the file, the bit rate of the file, and an image of a CD jacket.

In the case where the item objects 14 are moving images, for example, if the user selects one of the item objects 14, the control device 12 plays a moving image corresponding to the item object 14 thus selected. At this time, the control device 12 causes the display unit 62 to display images of buttons of a moving image player on the display device 32. The control device 12 may cause the contents management unit 80 to read information of the moving image file from the contents database 84, and cause the display unit 62 to display the information on the display device 32. The information of the moving image file includes current played time, the length of the entire played time, the name of the file, the bit rate of the file, and an image of a DVD video jacket.

In the case where the item objects 14 are text files, for example, if the user selects one of the item objects 14, the control device 12 executes an application program associated with a text file corresponding to the item object 14 thus selected. Specifically, the control device 12 executes a text viewer, a text editor, a word processor, and the like, and displays the text file thus selected by using these application programs.

In the case where the item objects 14 are images representing phone numbers in the address book data, for example, if the user selects one of the item objects 14, the control device 12 performs processing for requesting a phone call with a telephone number corresponding to the item object 14 thus selected. In the case where the item objects 14 are images representing e-mail addresses in the address book data, if the user selects one of the item objects 14, the control device 12 displays a screen for composing an e-mail to be transmitted to an e-mail address corresponding to the item object 14 thus selected on the display device 32. In the case where the item objects 14 are images representing addresses of Web pages (Uniform Resource Locator (URL)), if the user selects one of the item objects 14, the control device 12 connects to a URL corresponding to the item object 14 thus selected (downloads a file of the linked page, and executes an application program corresponding to the file).

As described above, if one of the item objects 14 is selected, the control device 12 executes an application program associated in advance with the item object 14 thus selected. With this configuration, the portable electronic apparatus 1 can execute an application program desired by the user by an intuitive operation performed by the user.

The portable electronic apparatus 1 according to the present embodiment further has a characteristic in the order of the item objects 14 when the item objects 14 are displayed in an aligned manner on the display device 32 as illustrated in FIG. 5C. If the input device 34 detects input of moving at least one of the first point P1 and the second point P2 in the group object 16 in a direction away from the other, the object control unit 70 arranges the item objects 14 in order based on a first predetermined standard in the direction in which the distance between the first point P1 and the second point P2 increases.

The first predetermined standards include an alphabetical order of the file name, an order of updated date and time of the file, an order of the file size, and an order of the file type. Furthermore, if the group object 16 is a group object surrounding the item objects 14 narrowed down by search refinement, the first predetermined standards also include an order of the relevance ratio between the file and the search criteria. The relevance ratio used herein means a value indicating a rate of consistency of a file with the search criteria. If the relevance ratio of a file is 100%, for example, the file completely includes information of a keyword, an image, and the like specified as the search criteria. In the present embodiment, an explanation will be made of the case where, if the input device 34 detects input of moving at least one of the first point P1 and the second point P2 in the group object 16 in a direction away from the other, the object control unit 70 arranges the item objects 14 in the order of the relevance ratio in the direction in which the distance between the first point P1 and the second point P2 increases.

Specifically, as illustrated in FIG. 5C, if the user moves the first point P1 and the second point P2 such that the distance between the first point P1 and the second point P2 increases in the first direction D1, the object control unit 70 arranges the item objects 14 in the first direction D1 such that the relevance ratio decreases gradually from the first point P1 to the second point P2. With this configuration, the user inputs an operation of moving the first point P1 and the second point P2 such that the distance between the first point P1 and the second point P2 increases in the first direction D1 to the input device 34, thereby, in addition to align the item objects 14, rearranging the item objects 14 in the order of the relevance ratio. As a result, the portable electronic apparatus 1 can reduce the amount of operation performed by the user for rearranging the order of the item objects 14 based on the first predetermined standard. In other words, the portable electronic apparatus 1 can reduce burden on the user.

The object control unit 70 is not limited to the configuration that aligns the item objects 14 in the case where the contact with both the first point P1 and the second point P2 is moved in the directions away from each other. The object control unit 70 also aligns the item objects 14, for example, in the case where the first point P1 is fixed, and the contact with the second point P2 alone is moved in the direction away from the first point P1. The object control unit 70 also aligns the item objects 14, for example, in the case where the second point P2 is fixed, and the contact with the first point P1 alone is moved in the direction away from the second point P2.

It is preferable that the object control unit 70 reverse the order of arrangement of the item objects 14 between the case where the second point P2 in the group object 16 is moved in the direction away from the first point P1 and the case where the first point P1 is moved in the direction away from the second point P2. Specifically, if the second point P2 in the group object 16 is moved in the direction away from the first point P1, the object control unit 70 arranges the item objects 14 in order such that the relevance ratio decreases from the first point P1 to the second point P2. In other words, the object control unit 70 arranges the item object 14 having higher relevance ratio closer to the first point P1 thus fixed. By contrast, if the contact with the first point P1 in the group object 16 is moved in the direction away from the second point P2, the object control unit 70 arranges the item objects 14 in order such that the relevance ratio decreases from the second point P2 to the first point P1. In other words, the object control unit 70 arranges the item object 14 having higher relevance ratio closer to the second point P2 thus fixed.

Conventionally, if the user desires to reverse the order of the item objects 14, the user needs to input an operation of aligning the item objects 14 to the input device 34 first, and then input an operation of reversing the order of the item objects 14 to the input object 34. However, the portable electronic apparatus 1 reverses the order of the item objects 14 thus aligned depending on either of which the first point P1 or the second point P2 is moved, and displays the item objects 14 on the display device 32. With this configuration, the user can input an operation of specifying the order of the item objects 14 together with an operation of aligning the item objects 14 to the input device 34. As a result, the portable electronic apparatus 1 can reduce the amount of operation performed by the user for rearranging the order of the item objects 14 based on the first predetermined standard. In other words, the portable electronic apparatus 1 can reduce burden on the user.

Furthermore, by arranging the item object 14 having higher relevance ratio closer to the side thus fixed between the two different points in the group object 16, the portable electronic apparatus 1 can realize organization of the item objects 14 by a more intuitive operation. Because the user tends to attach a higher value to the item object 14 having higher relevance ratio, the user tends to fix the item object 14 having a higher value. Therefore, by arranging the item object 14 having higher relevance ratio closer to the side thus fixed between the two different points in the group object 16, the portable electronic apparatus 1 can realize organization of the item objects 14 by a more intuitive operation. The organization herein includes rearrangement of the item objects 14 in a desired order.

In the present embodiment, if both the first point P1 and the second point P2 are moved in the directions away from each other, for example, the object control unit 70 arranges the item object 14 having higher relevance ratio closer to the first point P1 on the left side viewed from the user. This is because the user tends to consider the left side the beginning. The user also tends to arrange the item object 14 with a higher value at the beginning side. Therefore, for example, the object control unit 70 arranges the item object 14 having higher relevance ratio closer to the first point P1 on the left side viewed from the user, thereby making it possible to reduce a feeling of strangeness provided to the user. Depending on users, however, it may be expected that the item object 14 having higher relevance ratio is arranged closer to the second point P2 on the right side viewed from the user. Therefore, it is preferable that the portable electronic apparatus 1 be configured such that the user can specify in advance on either side of which the first point P1 or the second point P2 the item object 14 having higher relevance ratio is arranged. With this configuration, the portable electronic apparatus 1 can further reduce a feeling of strangeness provided to the user.

The direction in which the distance between the first point P1 and the second point P2 increases is not limited to the first direction D1. An explanation will be made of the case where the input device 34 detects input of moving at least one of a first point and a second point in a direction away from the other along a different direction from the first direction D1.

Figure 6A:
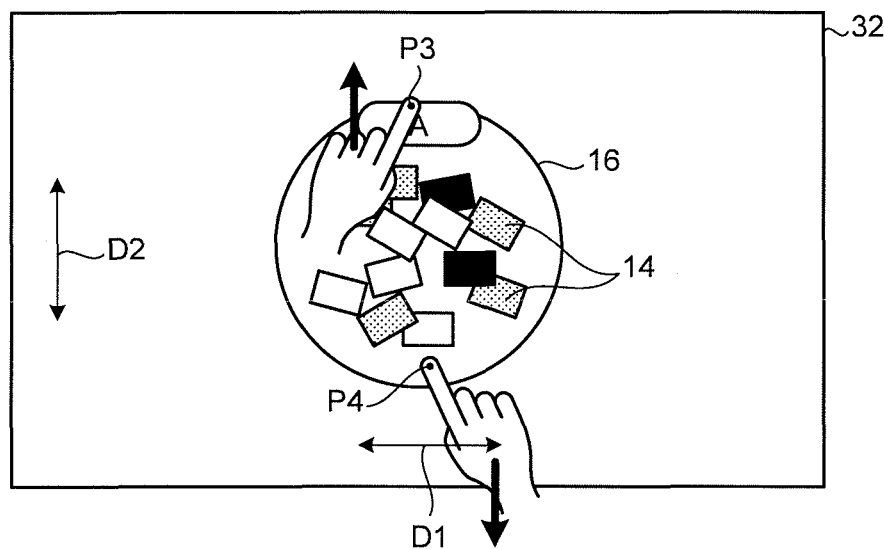
FIG. 6A is a view for explaining the image displayed on the display device when the arrangement of the item objects is in the initial state.
Figure 6B:
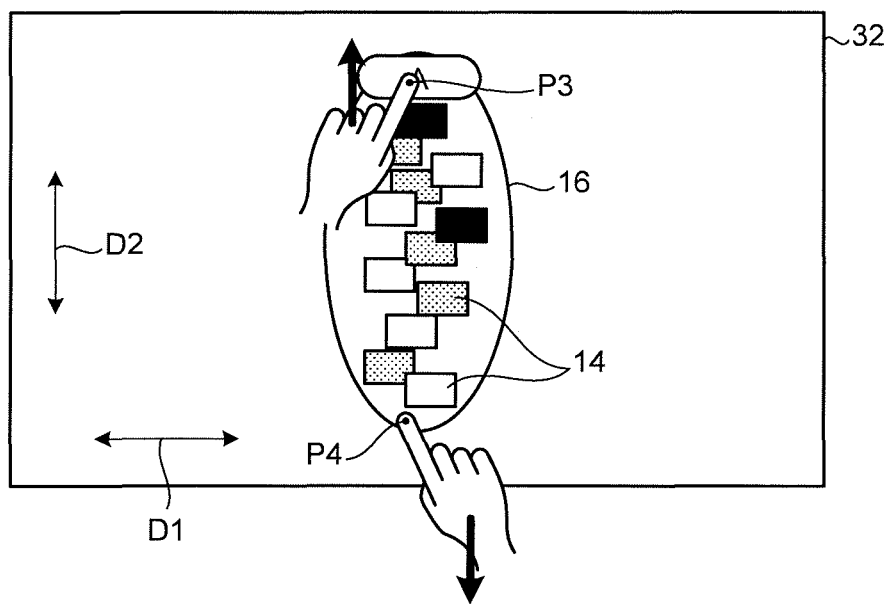
FIG. 6B is a view for explaining the image displayed on the display device when the item objects are being aligned in a second direction.
Figure 6C:
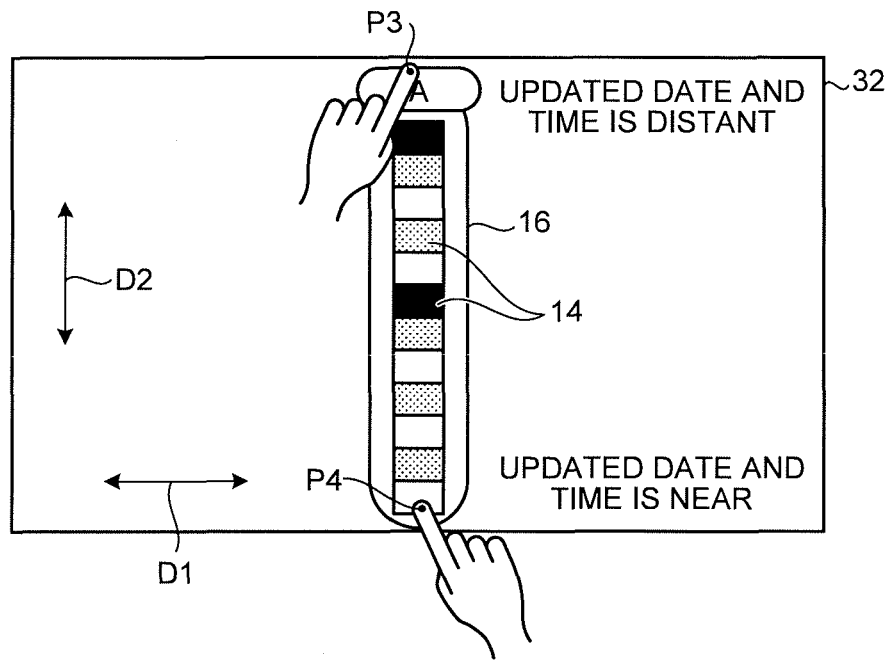
FIG. 6C is a view for explaining the image displayed on the display device when the alignment of the item objects in the second direction is completed.
Figure 6D:
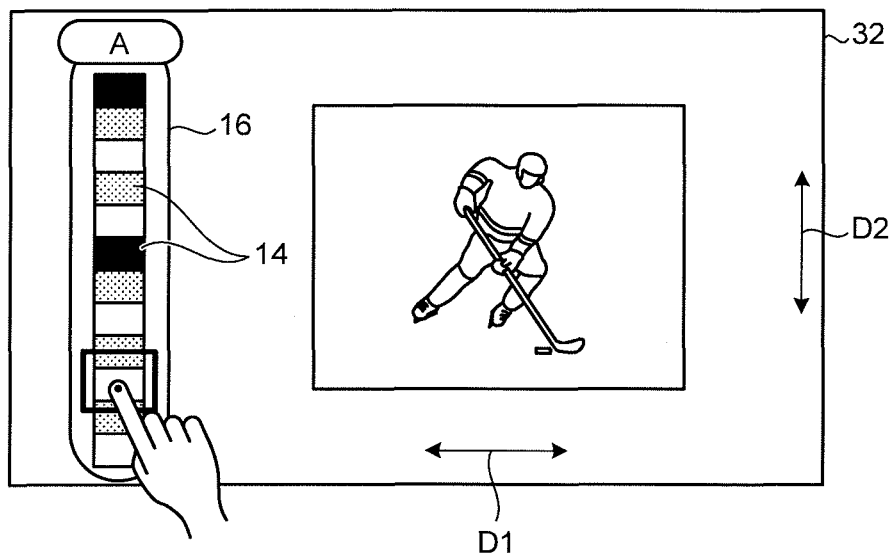
FIG. 6D is a view for explaining the image displayed on the display device when a preview is displayed.

FIG. 6A is a view for explaining the image displayed on the display device when the arrangement of the item objects is in the initial state. FIG. 6B is a view for explaining the image displayed on the display device when the item objects are being aligned in a second direction. FIG. 6C is a view for explaining the image displayed on the display device when the alignment of the item objects in the second direction is completed. FIG. 6D is a view for explaining the image displayed on the display device when a preview is displayed.

As illustrated in FIG. 6A, the control 12 displays the item objects 14 arranged randomly and the group object 16 surrounding the item objects 14 on the display device 32 as an initial state. When aligning the item objects 14 arranged randomly, the user inputs an operation of stretching the group object 16 in the second direction D2 to the input device 34 as illustrated in FIG. 6A. In other words, the user inputs an operation of increasing the distance between two points in the group object 16 to the input device 34. The two points described above are represented as a first point P3 and a second point P4. The user, for example, moves contact with the first point P3 in a direction away from the second point P4, and moves the second point P4 in a direction away from the first point P3. This causes the distance between the first point P3 and the second point P4 to increase as illustrated in FIG. 6B. The direction in which the distance between the first point P3 and the second point P4 increases is coincident with the second direction D2. In other words, the user inputs an operation of stretching the group object 16 in the second direction D2 to the input device 34.

The object display unit 72 arranges the item objects 14 in the direction in which the distance between the contacts with the first point P3 and the second point P4 increases, that is, in the second direction D2. In the present embodiment, as the distance between the first point P3 and the second point P4 increases, the object display unit 72 arranges the item objects 14 in a more aligned manner in the second direction D2. In other words, as the distance between the first point P3 and the second point P4 increases, the object display unit 72 reduces variation in the item objects 14 in the first direction D1.

The object display unit 72 stretches the shape of the group object 16 in the direction in which the distance between the first point P3 and the second point P4 increases, that is, in the second direction D2. Specifically, the object display unit 72 extends the group object 16 in the second direction D2, and shrinks the group object 16 in the first direction D1. This makes the size of the group object 16 in the second direction D2 larger than that in the first direction D1. In the present embodiment, as the distance between the first point P3 and the second point P4 increases, the object display unit 72 makes the size of the group object 16 in the second direction D2 larger than the current size, and makes the size of the group object 16 in the first direction D1 smaller than current size. In other words, as the distance between the first point P3 and the second point P4 increases, the object display unit 72 increases the ratio of the size of the group object 16 in the second direction D2 to that in the first direction D1.

If the input of increasing the distance between the first point P3 and the second point P4 is input to the input device 34, and the variation in the item objects 14 in the first direction D1 is eliminated, the display device 32 displays the item objects 14 in a line in the second direction D2 as illustrated in FIG. 6C, for example. The group object 16 is extended in the second direction D2 to be in a shape surrounding the item objects 14 arranged in a line.

As described above, the user inputs an operation of extending the group object 16 in the second direction D2 to the input device 34, whereby the portable electronic apparatus 1 displays the item objects 14 in a manner aligned in the second direction D2 on the display device 32. Thus, the portable electronic apparatus 1 can display the item objects 14 displayed on the display device 32 in an aligned manner by an intuitive operation performed by the user. In the state where the item objects 14 are aligned, if the user selects one of the item objects 14 by a signal contact point as illustrated in FIG. 6D, the display unit 62 displays a preview of the item object 14 thus selected together with the group object 16 and the item objects 14 on the display device 32.

The portable electronic apparatus 1 according to the present embodiment has a characteristic in the order of the item objects 14 when the item objects 14 are displayed in an aligned manner on the display device 32 as illustrated in FIG. 6C. If the input device 34 detects input of moving at least one of the first point P3 and the second point P4 in the group object 16 in a direction away from the other, and the direction in which the distance between the first point P3 and the second point P4 increases is the second direction D2, the object control unit 70 arranges the item objects 14 in order based on a second predetermined standard in the second direction D2.

The second predetermined standard is a different standard from the first predetermined standard. If the first predetermined standard is the relevance ratio, the second predetermined standard is the alphabetical order of the file name, the order of updated date and time of the file, the order of the file size, or the order of the file type, for example. In the description below, an explanation will be made of the case where, if the input device 34 detects input of moving at least one of the first point P3 and the second point P4 in the group object 16 in the direction away from the other, the object control unit 70 arranges the item objects 14 in the order of the updated date and time in the direction in which the distance between the first point P3 and the second point P4 increases. If the item object 14 is a photo file captured by a digital camera, and no processing is performed on the photo, the updated date and time is usually identical to the capturing date and time.

As illustrated in FIG. 6C, if the user moves the first point P3 and the second point P4 such that the distance between the first point P3 and the second point P4 increases in the second direction D2, the object control unit 70 arranges the item objects 14 in the second direction D2 such that the updated date and time is gradually distant from the current time from the first point P3 to the second point P4. With this configuration, the user inputs an operation of moving the first point P3 and the second point P4 such that the distance between the first point P3 and the second point P4 increases in the second direction D2 to the input device 34, thereby, in addition to align the item objects 14, rearranging the item objects 14 in the order of the updated date and time. As a result, the portable electronic apparatus 1 can reduce the amount of operation performed by the user for rearranging the order of the item objects 14 based on the second predetermined standard. In other words, the portable electronic apparatus 1 can reduce burden on the user.

Conventionally, in order to rearrange the order of a plurality of item objects by different predetermined standards, the user needs to input an operation of specifying the predetermined standard to the input device prior to rearranging the order of the item objects. In the portable electronic apparatus 1, however, the user can input an operation of specifying the predetermined standard together with an operation of rearranging the order of the item objects 14 to the input device 34. With this configuration, the portable electronic apparatus 1 can reduce the amount of operation performed by the user for specifying the predetermined standard different from the first predetermined standard. In other words, the portable electronic apparatus 1 can reduce burden on the user.

In addition to the case where both the first point P3 and the second point P4 are moved in the directions away from each other, the object control unit 70 aligns the item objects 14 in the case where the first point P3 is fixed, and the second point P4 alone is moved in the direction away from the first point P3. The object control unit 70 also aligns the item objects 14, for example, in the case where the second point P4 is fixed, and the first point P3 alone is moved in the direction away from the second point P4.

It is preferable that the object control unit 70 reverse the order of arrangement of the item objects 14 between the case where the second point P4 in the group object 16 is moved in the direction away from the first point P3 and the case where the first point P3 is moved in the direction away from the second point P4. Specifically, if the second point P4 in the group object 16 is moved in the direction away from the first point P3, the object control unit 70 arranges the item objects 14 in order such that the updated date and time approaches the current time from the first point P3 to the second point P4. In other words, the object control unit 70 arranges the item object 14 whose updated date and time is more distant from the current time closer to the first point P3 thus fixed. By contrast, if the first point P3 in the group object 16 is moved in the direction away from the second point P4, the object control unit 70 arranges the item objects 14 in order such that the updated date and time approaches the current time from the second point P4 to the first point P3. In other words, the object control unit 70 arranges the item object 14 whose updated date and time is more distant from the current time closer to the second point P4 thus fixed.

As described above, depending on either of which the first point P3 or the second point P4 is moved, the portable electronic apparatus 1 reverses the order of the item objects 14 thus aligned. Therefore, the user can input an operation of specifying the order of the item objects 14 together with an operation of aligning the item objects 14 to the input device 34. With this configuration, the portable electronic apparatus 1 can reduce the amount of operation by the user required for specifying the order of the item objects 14 to rearrange the item objects 14. In other words, the portable electronic apparatus 1 can reduce burden on the user.

As described above, in the present embodiment, if both the first point P3 and the second point P4 are moved in the directions away from each other, the object control unit 70 arranges the item object 14 whose updated date and time is more distant from the current time closer to the first point P3 on the upper side viewed from the user (farther side from the user). This is because the user tends to consider the upper side the beginning. The user also tends to arrange the item objects 14 in chronological order from the beginning side to the end side. Therefore, for example, the object control unit 70 arranges the item object 14 whose updated date and time is more distant from the current time closer to the first point P3 on the upper side viewed from the user, thereby making it possible to reduce a feeling of strangeness provided to the user.

Depending on users, however, it may be expected that the item object 14 whose updated date and time is more distant from the current time is arranged closer to the second point P4 on the lower side viewed from the user. Therefore, it is preferable that the portable electronic apparatus 1 be configured such that the user can specify in advance on either side of which the first point P3 or the second point P4 the item object 14 whose updated date and time is more distant from the current time is arranged. With this configuration, the portable electronic apparatus 1 can further reduce a feeling of strangeness provided to the user.

The explanations have been made of the operation input by the user to the input device 34 in order to organize the item objects 14 displayed on the display device 32 and the operation of the portable electronic apparatus 1. A series of process performed by the control device 12 in order to realize the operations described above will now be explained.

Figure 7:
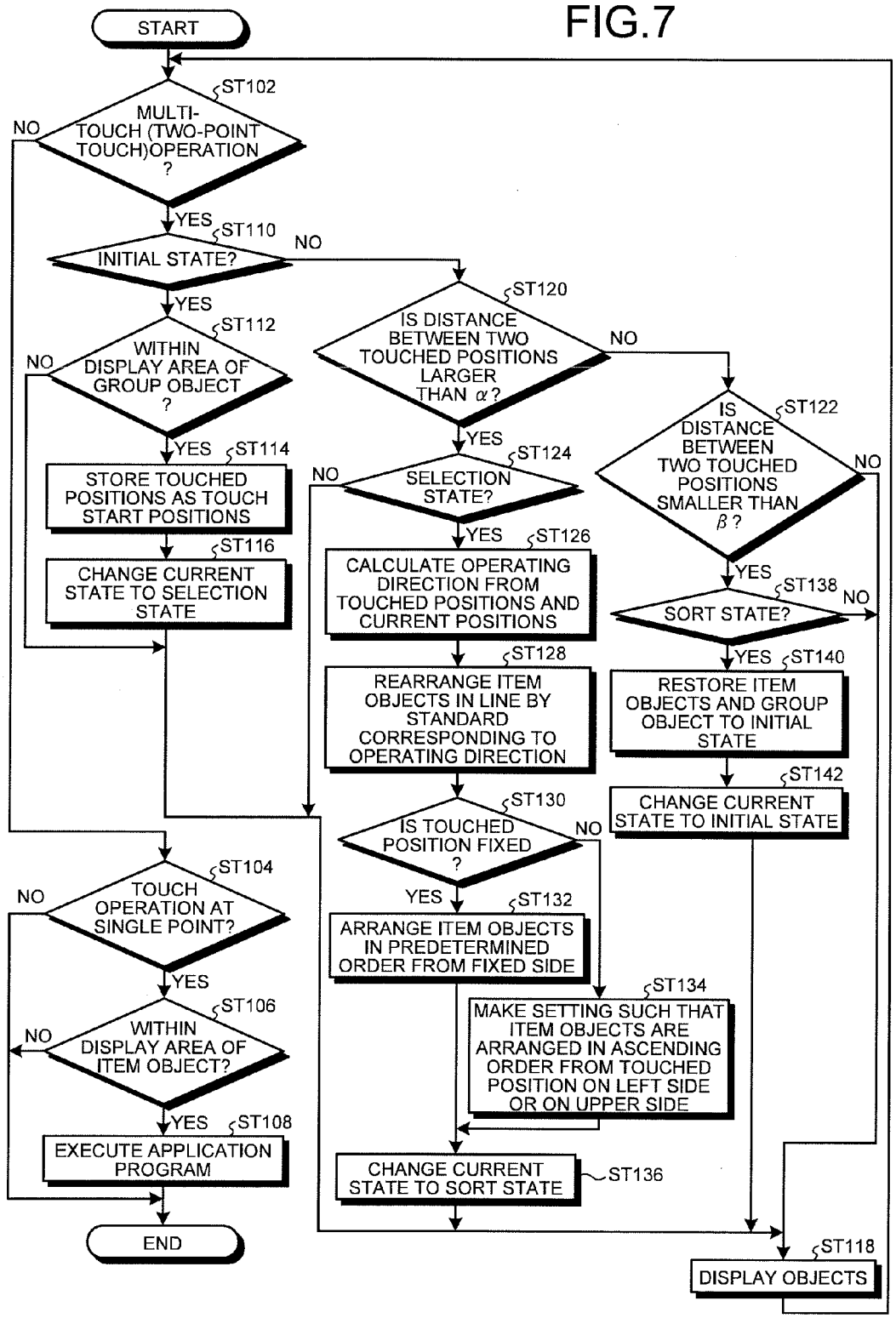
FIG. 7 is a flowchart of a process performed by the control device in order to organize a plurality of item objects and to display the item objects on the display device.

FIG. 7 is a flowchart of the process performed by the control device in order to organize the item objects and to display the item objects on the display device. At Step ST102, the input control unit 64 of the control device 12 illustrated in FIG. 2 acquires a result detected by the input device 34 from the input device 34. The information organizing unit 60 of the control device 12 then determines whether the user performs a multi-touch operation on the input device 34. The multi-touch operation herein means an operation of coming into contact with the input device 34 at two points.

If the user performs no multi-touch operation (NO at Step ST102), the information organizing unit 60 determines whether the user touches the input device 34 at single point at Step ST104. If the user touches the input device 34 at single point (YES at Step ST104), the information organizing unit 60 determines whether the point at which the user touches the input device 34 is within an area in which the item object 14 is displayed at Step ST106. If the point at which the user touches the input device 34 is within the area in which the item object 14 is displayed (YES at Step ST106), the contents control unit 66 of the control device 12 executes an application program associated with the item object 14 selected by the user at Step ST108. After performing the processing of Step ST108, the control device 12 terminates the series of process. If the information organizing unit 60 determines that the user does not touch the input device 34 at single point at Step ST104 (NO at Step ST104), or if the information organizing unit 60 determines that the point at which the user touches the input device 34 is not within an area in which the item object 14 is displayed (NO at Step ST106), the control device 12 terminates the series of process.

If the information organizing unit 60 determines that the user performs the multi-touch operation at Step ST102 (YES at Step ST102), the information organizing unit 60 determines whether the arrangement of the item objects 14 is in an initial state at Step ST110. The initial state herein means a state in which the item objects 14 are arranged randomly on the display device 32 as illustrated in FIG. 5A and FIG. 6A. In the initial state, the size of the group object 16 in the first direction D1 and that in the second direction D2 are approximately in a ratio of one to one. The information organizing unit 60 determines whether the arrangement of the item objects 14 is in the initial state from the arrangement of each of the item objects 14 and/or the shape of the group object 16, for example.

If the arrangement of the item objects 14 is in the initial state (YES at Step ST110), the information organizing unit 60 determines whether both the two points at which the user touches the input device 34 are within the area in which the group object 16 is displayed at Step ST112. Specifically, the information organizing unit 60 acquires a detection result from the input device 34, and determines whether both the two points are within the area in which the group object 16 is displayed based on the result. If both the two points at which the user touches the input device 34 are within the area in which the group object 16 is displayed (YES at Step ST112), the information management unit 76 of the control device 12 stores the positions of the two points at which the user touches the input device 34 in the information database 78 as touch start positions at Step ST114.

The information management unit 76 then changes the current state from the initial state to a selection state at Step ST116. Specifically, the information management unit 76 stores information indicating that the current state is the selection state in the information database 78. Subsequently, the display unit 62 of the control device 12 displays the item objects 14 and the group object 16 on the display device 32 at Step ST118. If both of the two points at which the user touches the input device 34 are not within the area in which the group object 16 is displayed (NO at Step ST112), the control device 12 performs the processing of Step ST118 without performing the processing of Step ST114 and the processing of Step ST116. The control device 12 then performs the processing subsequent to Step ST118. After performing the processing of Step ST118, the control device 12 returns to the processing of Step ST102, performs the processing of Step ST102, and performs the processing subsequent to Step ST102.

The information organizing unit 60 determines that the current state is not the initial state at Step ST110 (NO at Step ST110). This is because the control device 12 has already performed the processing of Step ST116. Subsequently, the information management unit 76 acquires the distance between the two points touched by the user from the information database 78 at Step ST120. The information organizing unit 60 then determines whether the distance between the two points is equal to or larger than a predetermined value $\alpha$. If the distance between the two points is smaller than the predetermined value $\alpha$ (NO at Step ST120), the information organizing unit 60 determines whether the distance between the two points is equal to or smaller than a predetermined value $\beta$ at Step ST122. The predetermined value $\alpha$ used herein is such a value that, if the distance between the two points is equal to or larger than the predetermined value $\alpha$, it can be determined that the user is operating the input device 34 in order to increase the distance between the two points and to organize the item objects 14. By contrast, the predetermined value $\beta$ used herein is such a value that, if the distance between the two points is equal to or smaller than the predetermined value $\beta$, it can be determined that the touch performed by the user is an erroneous touch or the user intends to cancel the organization of the item objects 14. It is preferable that the predetermined value $\alpha$ be a value larger than the distance between the two points in the initial state. The predetermined value $\beta$ only needs to be a value smaller than the distance between the two points in the initial state. With this configuration, the information organizing unit 60 can determine whether the user is operating the input device 34 in order to increase the distance between the two points and to organize the item objects 14, or the user intends to cancel the organization of the item objects 14 while preventing an increase in the processing to be performed.

If the distance between the two points at which the user touches the input device 34 is equal to or larger than the predetermined value $\alpha$ (YES at Step ST120), the information organizing unit 60 determines whether the current state is the selection state at Step ST124. If the current state is the selection state (YES at Step ST124), the information management unit 76 acquires the touch start positions from the information database 78 at Step ST126. The information organizing unit 60 acquires the current touch positions detected by the input device 34 via the input control unit 64. The information organizing unit 60 then calculates moving directions of the two points touched by the user from these values. Specifically, for example, the information organizing unit 60 calculates the moving direction of the first point P1 from two pieces of information on the position of the first point P1 illustrated in FIG. 5A and the position of the first point P1 illustrated in FIG. 5C. For example, the information organizing unit 60 calculates the moving direction of the second point P2 from two pieces of information on the position of the second point P2 illustrated in FIG. 5A and the position of the second point P2 illustrated in FIG. 5C. The information organizing unit 60 then stores an intermediate (average) direction between the moving direction of the first point P1 and the moving direction of the second point P2 in the information database 78 as an operating direction by the user, for example. The moving direction of the first point P1 and the moving direction of the second point P2 tend to be nearly coincident with each other. Therefore, the information organizing unit 60 may store either of the moving direction of the first point P1 or the moving direction of the second point P2 in the information database 78 as the operating direction by the user.

Subsequently, the object display unit 72 of the control device 12 arranges the item objects 14 in a line by a predetermined standard corresponding to the operating direction at Step ST128. Specifically, if the input device 34 detects input of increasing the distance between the two different points in the group object 16 in the first direction D1 as illustrated in FIG. 5C, the object display unit 72 arranges the item objects 14 in a line based on the relevance ratio at Step ST128. If the input device 34 detects input of increasing the distance between the two different points in the group object 16 in the second direction D2 as illustrated in FIG. 6C, the object display unit 72 arranges the item objects 14 in a line based on the updated date and time at Step ST128.

In this case, the object display unit 72 does not align the item objects 14 being displayed on the display device 32, but aligns the item objects 14 virtually so as to generate an image to be displayed on the display device 32 when the processing of Step ST118 is performed thereafter. Furthermore, the object display unit 72 changes the shape of the group object 16. Specifically, the object display unit 72 extends the group object 16 in a direction in which the distance between the two points operated by the user, that is, the distance between the two different points in the group object 16 increases. Furthermore, the object display unit 72 shrinks the group object 16 in a direction perpendicular to the direction in which the distance between the two different points in the group object 16 increases.

Subsequently, the information organizing unit 60 determines whether one of the two points touched by the user is fixed at Step ST130. At this time, even if the user intends to fix one of the two points, the point may be slightly moved actually. If such a slight movement of the point is detected, it is determined that the point is fixed. In other words, if the amount of movement of the point touched by the user is smaller than a predetermined value, the object operation unit 74 determines that one of the two points touched by the user is fixed.

If one of the two points touched by the user is fixed (YES at Step ST130), the object display unit 72 arranges the item objects 14 in a predetermined order from the fixed point side to the moved point side at Step ST132. Specifically, if the item objects 14 are arranged based on the relevance ratio as illustrated in FIG. 5C, the object display unit 72 arranges the item object 14 having higher relevance ratio closer to the point thus fixed, and arranges the item object 14 having lower relevance ratio closer to the point being moved. Alternatively, if the item objects 14 are arranged based on the updated date and time as illustrated in FIG. 6C, the object display unit 72 arranges the item object 14 whose updated date and time is more distant from the current time closer to the point thus fixed, and arranges the item object 14 whose updated date and time is nearer the current time closer to the point being moved.

By contrast, if one of the two points touched by the user is not fixed (NO at Step ST130), the object display unit 72 arranges the item objects 14 in a predetermined order from the first point P1 on the left side viewed from the user to the second point P2 as illustrated in FIG. 5C at Step ST134. Specifically, if the item objects 14 are arranged based on the relevance ratio as illustrated in FIG. 5C, the object display unit 72 arranges the item object 14 having higher relevance ratio closer to the first point P1, and arranges the item object 14 having lower relevance ratio closer to the second point P2. Alternatively, if the item objects 14 are arranged based on the updated date and time as illustrated in FIG. 6C, the object display unit 72 arranges the item object 14 whose updated date and time is more distant from the current time closer to the first point P3, and arranges the item object 14 whose updated date and time is nearer the current time closer to the second point P4.

After performing the processing of Step S132 or the processing of Step S134, the information organizing unit 60 changes the current state from the selection state to a sort state at Step ST136. Specifically, the information management unit 76 stores information indicating that the current state is the sort state in the information database 78. The sort state herein is a state in which the item objects 14 are aligned in order based on a predetermined standard, and the group object 16 is transformed from the initial state. Subsequently, the control device 12 performs the processing of Step ST118, and returns to Step ST102.

When performing the processing of Step ST124, the current state is the sort state in the control device 12. Therefore, the information organizing unit 60 determines that the current state is not the selection state (NO at Step ST124), and the control device 12 performs the processing of Step ST118. The control device 12 returns to Step ST102, performs the processing of Step ST102, and performs the processing subsequent to Step ST102.

An assumption is made that the user inputs an operation of moving the two different points in the group object 16 close to each other so as to shrink the shape of the group object 16 to the input device 34. If the distance between the two points is larger than the predetermined value β (NO at Step ST122), the control device 12 performs the processing of Step ST118, and performs the processing subsequent to Step ST118. By contrast, if the distant between the two points is equal to or smaller than the predetermined value β (YES at Step ST122), the information organizing unit 60 determines whether the current state is the sort state at Step ST138. If the current state is not the sort state (NO at Step ST138), the control device 12 performs the processing of Step ST118, and performs the processing subsequent to Step ST118. By contrast, if the current state is the sort state (YES at Step ST138), the object display unit 72 restores the arrangement of the item objects 14 and the shape of the group object 16 to the initial state illustrated in FIG. 5A and FIG. 6A at Step ST140. Subsequently, the information organizing unit 60 changes the current state from the sort state to the initial state at Step ST142. The control device 12 then performs the processing of Step ST118, and performs the processing subsequent to Step ST118.

By performing the series of process described above, if the input device 34 detects input of moving at least one of the two different points in the group object 16 in a direction away from the other, the control device 12 can align the item objects 14 in the direction in which the distance between the two points increases, and display the item objects 14 on the display device 32. Furthermore, if the input device 34 detects input of moving at least one of the two different points in the group object 16 in a direction away from the other, the control device 12 can extend the shape of the group object 16 in the direction in which the distance between the two points increases. At the same time, the control device 12 can shrink the shape of the group object 16 in a direction perpendicular to the direction in which the distance between the two points increases, and display the group object 16 on the display device 32.

If the input device 34 detects input of moving at least one of the two different points in the group object 16 in the direction away from the other, the control device 12 can rearrange the order of the item objects 14 based on a predetermined standard, and display the item objects 14 on the display device 32. The control device 12 can also reverse the order of the arrangement of the item objects 14 between the case where a first point in the group object 16 is moved in a direction away from a second point different from the first point in the group object 16 and the case where the second point is moved in a direction away from the first point, and display the item objects 14 on the display device 32.

The control device 12 can rearrange the order of the item objects 14 based on different standards between the case where the direction in which the distance between the two points increases is the first direction D1 and the case where the direction in which the distance between the two points increases is the second direction D2 different from the first direction D1, and display the item objects 14 on the display device 32. When displaying the group object 16 in a divided manner, the control device 12 can display the group object 16 on the display device 32 in the initial state prior to the state in which the item objects 14 are be displayed in an aligned manner. Furthermore, if the input device 34 detects input of coming into contact with an area in which the item object 14 is displayed at a single contact point, the control device 12 can execute an application program associated with the item object 14.

The portable electronic apparatus 1 further has a characteristic in allowing the user to divide the group object 16. An explanation will be made of an example of an operation performed by the user on the portable electronic apparatus 1 in order to divide the group object 16 displayed on the display device 32.

Figure 8A:
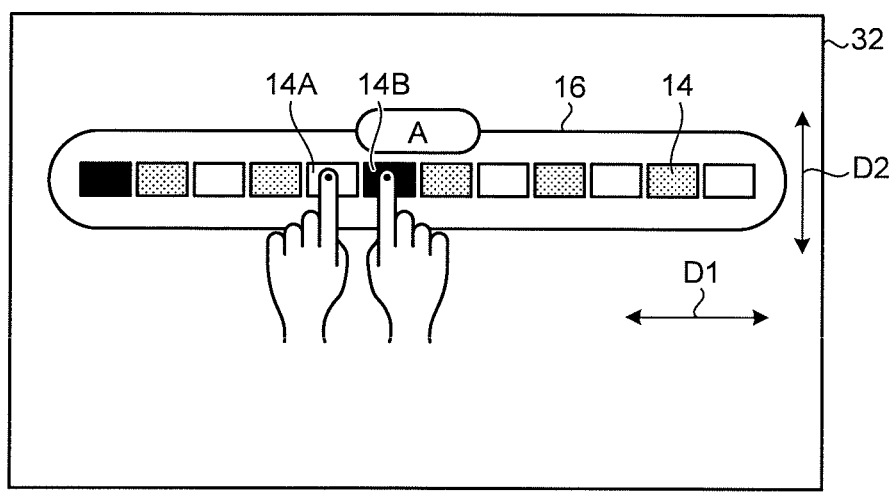
FIG. 8A is a view for explaining the image displayed on the display device when the item objects are organized.
Figure 8B:
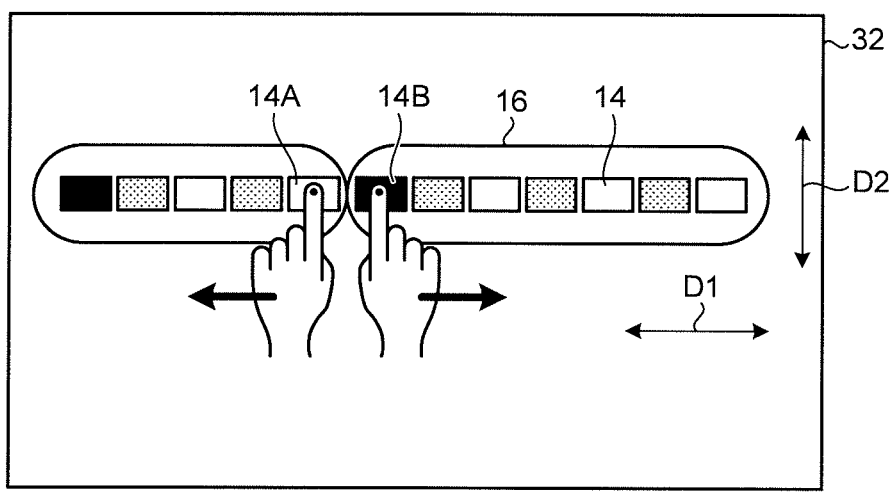
FIG. 8B is a view for explaining the image displayed on the display device when a group object is being divided into two.
Figure 8C:
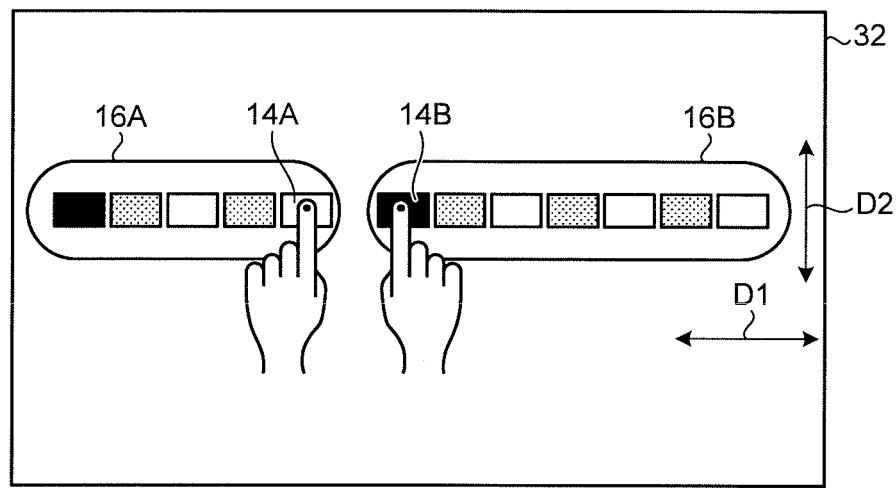
FIG. 8C is a view for explaining the image displayed on the display device when the group object is divided into two.
Figure 8D:
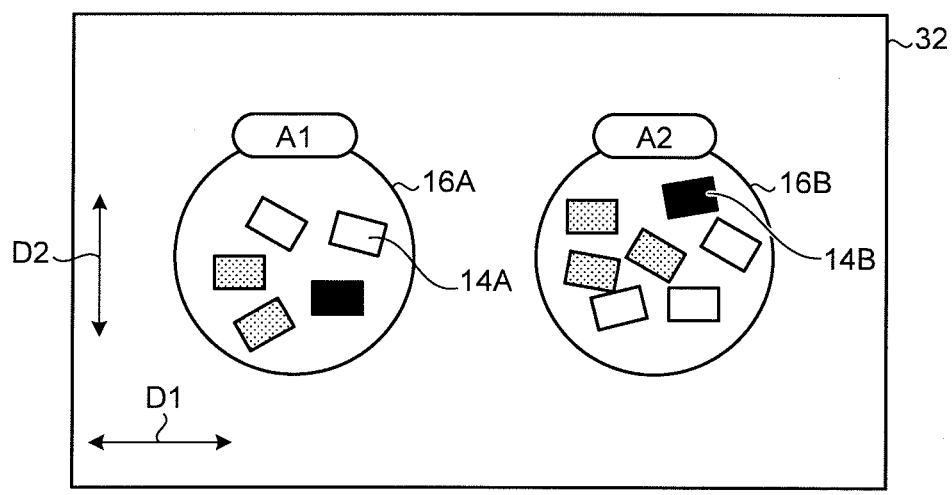
FIG. 8D is a view for explaining the image displayed on the display device when the division of the group object into two is completed and two group objects in the initial state are displayed.

FIG. 8A is a view for explaining the image displayed on the display device when the item objects are organized. FIG. 8B is a view for explaining the image displayed on the display device when the group object is being divided into two. FIG. 8C is a view for explaining the image displayed on the display device when the group object is divided into two. FIG. 8D is a view for explaining the image displayed on the display device when the division of the group object into two is completed and two group objects in the initial state are displayed.

The user selects item objects 14 adjacent to each other among the item objects 14 included in the group object 16. The item objects 14 adjacent to each other are represented as an item object 14A and an item object 14B. The user touches the input device 34 in the area in which the item object 14A is displayed, thereby selecting the item object 14A. Furthermore, the user touches the input device 34 in the area in which the item object 14B is displayed, thereby selecting the item object 14B.

Subsequently, as illustrated in FIG. 8B, the user performs an operation (performs second input) such that the distance between the item object 14A and the item object 14B increases in a state the item object 14A and the item object 14B are selected. Specifically, the user moves the item object 14A in a direction away from the item object 14B, and moves the item object 14B in a direction away from the item object 14A. Alternatively, the user fixes the item object 14B, and moves the item object 14A in the direction away from the item object 14B. Still alternatively, the user fixes the item object 14A, and moves the item object 14B in the direction away from the item object 14A.

As a result, the group object 16 is divided into two group objects 16 by a boundary between the item object 14A and the item object 14B as illustrated in FIG. 8C. The two group objects 16 are represented as a group object 16A and a group object 16B for convenience of explanation. The group object 16A includes the item object 14A, whereas the group object 16B includes the item object 14B. In the present embodiment, if the item objects 14 are aligned in the first direction D1, the sizes of the group object 16A and the group object 16B in the second direction D2 are equal to that of the group object 16 prior to being divided.

Subsequently, the user terminates the contact with the input device 34. In other words, the user removes his or her finger from the input device 34. As a result, the group object 16A and the group object 16B transform into the same shape as that of the group object 16 prior to being divided, that is, the shape in the initial state as illustrated in FIG. 8D. Specifically, in the group object 16A and the group object 16B, the size in the first direction D1 and the size in the second direction D2 are approximately in a ratio of one to one. At this time, the item objects 14 included in the group object 16A are arranged randomly. The item objects 14 included in the group object 16B are also arranged randomly.

The explanation has been made of the operation performed by the user on the portable electronic apparatus 1 in order to divide the group object 16 into two. The portable electronic apparatus 1 can divide the group object 16 into three as well. An explanation will be made of an example of an operation performed by the user on the portable electronic apparatus 1 in order to divide the group object 16 into three.

Figure 9A:
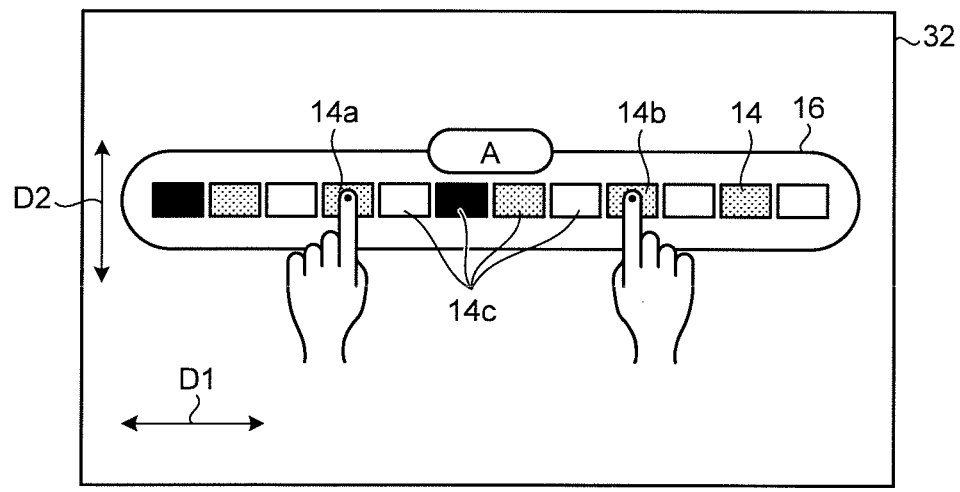
FIG. 9A is a view for explaining the image displayed on the display device when the item objects are organized.
Figure 9B:
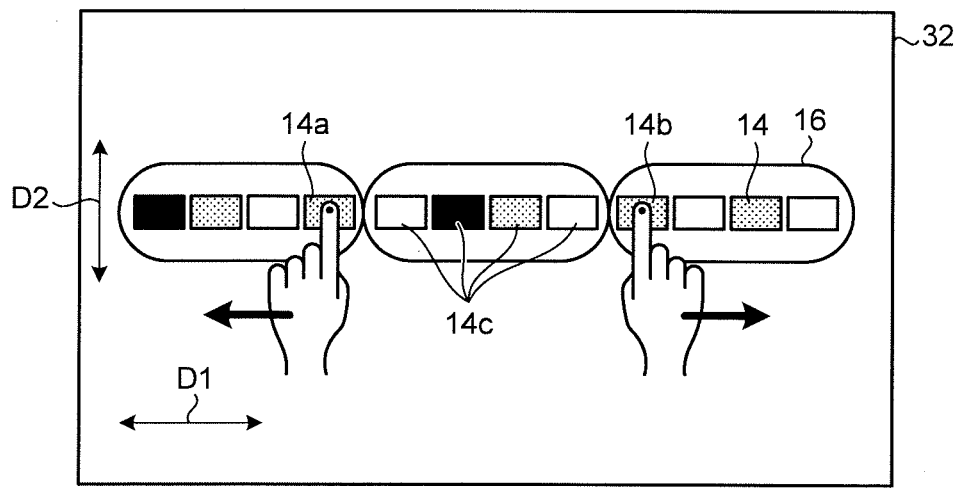
FIG. 9B is a view for explaining the image displayed on the display device when the group object is being divided into three.
Figure 9C:
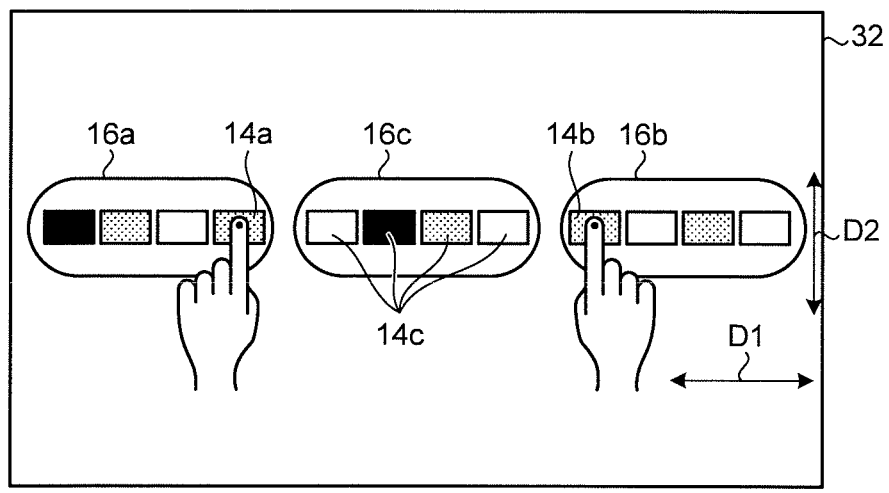
FIG. 9C is a view for explaining the image displayed on the display device when the group object is divided into three.
Figure 9D:
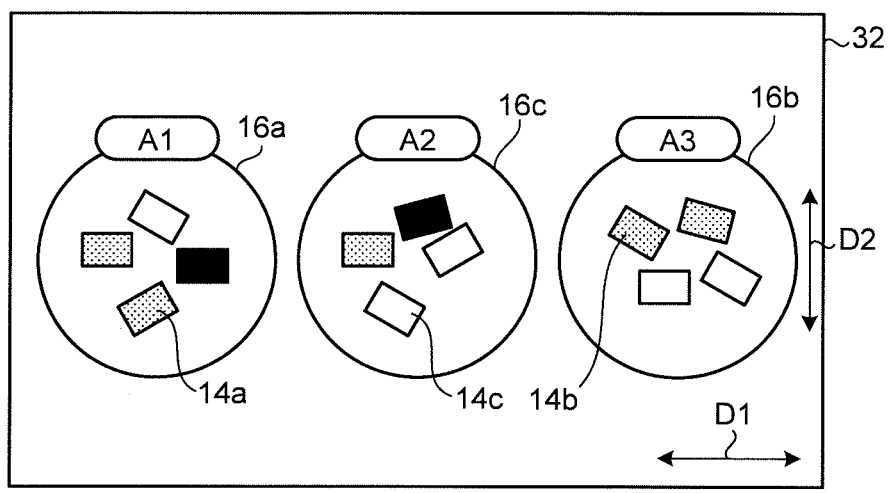
FIG. 9D is a view for explaining the image displayed on the display device when the division of the group object into three is completed and three group objects in the initial state are displayed.

FIG. 9A is a view for explaining the image displayed on the display device when the item objects are organized. FIG. 9B is a view for explaining the image displayed on the display device when the group object is being divided into three. FIG. 9C is a view for explaining the image displayed on the display device when the group object is divided into three. FIG. 9D is a view for explaining the image displayed on the display device when the division of the group object into three is completed and three group objects in the initial state are displayed.

The user selects two item objects 14 arranged with at least one item object 14 interposed therebetween among the item objects 14 included in the group object 16. The two item objects 14 arranged with at least one item object 14 interposed therebetween are represented as a first item object 14a and a second item object 14b. The item object 14 sandwiched between the first item object 14a and the second item object 14b is represented as an intermediate item object 14c. The user touches the input device 34 in the area in which the first item object 14a is displayed, thereby selecting the first item object 14a. The user touches the input device 34 in the area in which the second item object 14b is displayed, thereby selecting the second item object 14b.

Subsequently, as illustrated in FIG. 9B, the user performs an operation (performs third input) such that the distance between the first item object 14a and the second item object 14b increases in a state where the first item object 14a and the second item object 14b are selected. Specifically, the user moves the first item object 14a in a direction away from the second item object 14b, and moves the second item object 14b in a direction away from the first item object 14a.

As a result, the group object 16 is divided into two group objects 16 by a first boundary between the first item object 14a and the intermediate item object 14c adjacent to the first item object 14a as illustrated in FIG. 9C. The group object 16 including the first item object 14a between the two group objects 16 is represented as a first group object 16a. The group object 16 is divided into two group objects 16 by a second boundary between the second item object 14b and the intermediate item object 14c adjacent to the second item object 14b. The group object 16 including the second item object 14b between the two group objects 16 is represented as a second group object 16b.

The group object 16 is divided into three group objects 16 of the first group object 16a, the second group object 16b, and an intermediate group object 16c including the intermediate item object 14c. In the present embodiment, if the item objects 14 are aligned in the first direction D1, the sizes of the first group object 16a, the second group object 16b, and the intermediate group object 16c in the second direction D2 are equal to that of the group object 16 prior to being divided.

Subsequently, the user terminates the contact with the input device 34. In other words, the user removes his or her finger from the input device 34. As a result, the first group object 16a, the second group object 16b, and the intermediate group object 16c transform into the same shape as that of the group object 16 prior to being divided, that is, the shape in the initial state as illustrated in FIG. 9D. Specifically, in the first group object 16a, the second group object 16b, and the intermediate group object 16c, the size in the first direction D1 and the size in the second direction D2 are approximately in a ratio of one to one. At this time, the item objects 14 included in the first group object 16a are arranged randomly. The item objects 14 included in the second group object 16b are also arranged randomly. The item objects 14 included in the intermediate group object 16c are arranged randomly as well.

As described above, when dividing the group object 16, the user can input an operation of specifying the boundary of the division together with an operation of starting the division to the input device 34. With this configuration, the portable electronic apparatus 1 can reduce burden on the user when dividing the group object 16. Furthermore, the user selects two item objects 14 included in one group object 16, and inputs an operation of moving the two item objects 14 in directions away from each other, which evokes division, thereby dividing the group object 16 into two or three by a desired boundary. Therefore, the portable electronic apparatus 1 can realize division of the group object 16 by a more intuitive operation.

An advantageous effect achieved by the division of the group object 16 in a simple manner will now be explained. An assumption is made that the group objects 14 are photo files captured by a digital camera, for example. Further assumption is made that the item objects 14 illustrated in FIG. 8A and FIG. 9A are organized in order based on the relevance ratio. The user intends to extract an item object 14 matching the key object from the item objects 14. The item objects 14 can be classified into three types by the relevance ratio. The three types include item objects 14 whose relevance ratio is high enough to require no visual confirmation by the user, item objects 14 whose relevance ratio is low enough to require no visual confirmation by the user, and item objects 14 whose relevance ratio is insufficient, and that is required to be visually confirmed by the user.

The user divides the group object 16 into three by the operation described above. The user puts the item objects 14 whose relevance ratio is high enough to require no visual confirmation by the user in the first group object 16a. Furthermore, the user puts the item objects 14 whose relevance ratio is low enough to require no visual confirmation by the user in the second group object 16b. Moreover, the user puts the item objects 14 whose relevance ratio is insufficient, and that is required to be visually confirmed by the user in the intermediate group object 16c. As a result, the user can separate the item objects 14 required to be visually confirmed from other item objects 14 for which no visual confirmation is required. Therefore, the portable electronic apparatus 1 can facilitate visual confirmation of each of the item objects 14 performed by the user.

The explanations have been made of the operation input by the user to the input device 34 in order to divide the group object 16 displayed on the display device 32 and the operation of the portable electronic apparatus 1. A series of process performed by the control device 12 in order to realize the operations described above will now be described.

Figure 10:
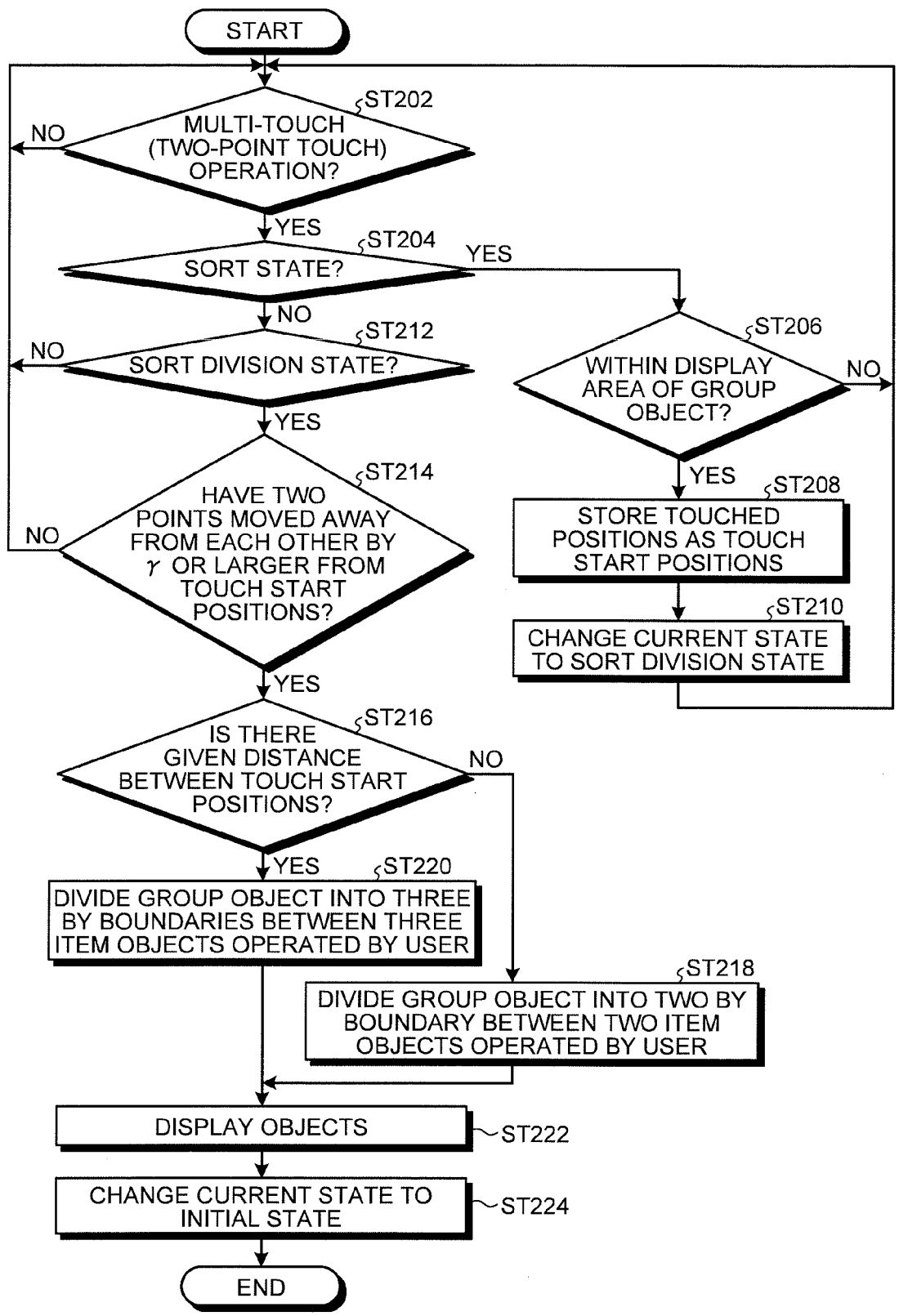
FIG. 10 is a flowchart of a process performed by the control device in order to divide the group object including the item objects thus aligned.

FIG. 10 is a flowchart of a process performed by the control device in order to divide the group object including the item objects thus aligned. At Step ST202, the input control unit 64 acquires a result detected by the input device 34 from the input device 34. The information organizing unit 60 then determines whether the user performs a multi-touch operation on the input device 34. If the user performs no multi-touch operation (NO at Step ST202), the control device 12 returns to Step ST202, performs the processing of Step ST202, and performs the processing subsequent to Step ST202. If the user performs the multi-touch operation (YES at Step ST202), the information organizing unit 60 determines whether the current state is the sort state at Step ST204. At this time, the information management unit 76 acquires information indicating the current state from the information database 78, and it is determined whether the current state is the sort state based on the information.

If the current state is the sort state (YES at Step ST204), the input control unit 64 acquires the current positions at which the user touches the input device 34 from the input device 34 at Step ST206. The information organizing unit 60 then determines whether the current positions at which the user touches the input device 34 are within the area in which the group object 16 is displayed. If the current positions at which the user touches the input device 34 are not within the area in which the group object 16 is displayed (NO at Step ST206), the control device 12 returns to Step ST202, performs the processing of Step ST202, and performs the processing subsequent to Step ST202. By contrast, if the current positions at which the user touches the input device 34 are within the area in which the group object 16 is displayed (YES at Step ST206), the information management unit 76 stores the current positions at which the user touches the input device 34 in the information database 78 as the touch start positions at Step ST208.

Subsequently, the information organizing unit 60 changes the current state from the sort state to a sort division state at Step ST210. The control device 12 then returns to Step ST202. At this time, the current state is the sort division state in the portable electronic apparatus 1. Therefore, the information organizing unit 60 determines that the current state is not the sort state at Step ST204 (NO at Step ST204). The information organizing unit 60 then determines whether the current state is the sort division state at Step ST212. If the current state is not the sort division state (NO at Step ST212), the control device 12 returns to Step ST202, performs the processing of Step ST202, and performs the processing subsequent to Step ST202. By contrast, if the current state is the sort division state (YES at Step ST212), the information management unit 76 acquires the touch start positions stored at Step ST208 from the information database 78 at Step ST214. Furthermore, the information organizing unit 60 acquires the current touch positions detected by the input device 34 via the input control unit 64. The information organizing unit 60 then determines whether the two points touched by the user have moved away from each other by a predetermined value γ or larger from these values. The predetermined value γ used herein is such a value that, if the two points touched by the user move away from each other by the predetermined value γ or larger, it can be determined that the user desires to divide the group object 16. In other words, if the two points touched by the user have moved away from each other by smaller than the predetermined value γ (NO at Step ST214), the information organizing unit 60 determines that the operation input to the input device 34 this time is not input for instructing division of the group object 16. The control device 12 then returns to Step ST202, performs the processing of Step ST202, and performs the processing subsequent to Step ST202.

By contrast, if the two points touched by the user have moved away from each other by the predetermined value γ or larger (YES at Step ST214), the information management unit 76 acquires the touch start positions stored at Step ST208 from the information database 78 at Step ST216. The information organizing unit 60 then determines whether the intermediate item object 14c is present between the two points touched by the user. Specifically, the information management unit 76 determines whether there is a distance in which the intermediate item object 14c can be displayed between the two points touched by the user. If no intermediate item object 14c is present between the two points touched by the user (NO at Step ST216), the object display unit 72 divides the group object 16 into two as illustrated in FIG. 8D by the boundary between the two item objects 14 selected by the user, that is, between the item object 14A and the item object 14B illustrated in FIG. 8C at Step ST218.

By contrast, if the intermediate item object 14c is present between the two points touched by the user (YES at Step ST216), the object display unit 72 divides the group object 16 by the first boundary between the two item objects 14 selected by the user, that is, between the first item object 14a and the intermediate item object 14c adjacent to the first item object 14a illustrated in FIG. 9C at Step ST220. Furthermore, the object display unit 72 divides the group object 16 by the second boundary between the second item object 14b and the intermediate item object 14c adjacent to the second item object 14b. As a result, the object display unit 72 divides the group object 16 into three group objects by the first boundary and the second boundary.

After performing the processing of Step S218 or the processing of Step S220, the information organizing unit 60 displays the item objects 14 and the group object 16 on the display device 32 at Step ST222. At this time, the group object 16 is displayed on the display device 32 in a manner divided into two or three. Subsequently, the information organizing unit 60 changes the current state from the sort division state to the initial state at Step ST224.

By performing the series of process described above, if the input device 34 detects input of moving two item objects 14 adjacent to each other among the item objects 14 in directions away from each other in a state where the item objects 14 are displayed on the display device 32 in an aligned manner, the control device 12 can display the group object 16 in a manner divided by the boundary between the two item objects 14.

Furthermore, if the input device 34 detects input of moving the first item object 14a and the second item object 14b arranged with at least one item object 14c interposed therebetween among the item objects 14 in directions away from each other in a state where the item objects 14 are displayed on the display device 32 in an aligned manner, the control device 12 can display the group object 16 in a divided manner. Specifically, the control device 12 divides the group object 16 into the first group object 16a including the first item object 14a, the second group object 16b including the second item object 14b, and the intermediate group object 16c including the intermediate item object 14c by the first boundary between the first item object 14a and the intermediate item object 14c and by the second boundary between the second item object 14b and the intermediate item object 14c.

As described above, when dividing the group object 16, the user can input an operation of specifying the boundary of the division together with an operation of starting the division to the input device 34. With this configuration, the portable electronic apparatus 1 can reduce burden on the user when dividing the group object 16. Furthermore, the user selects two item objects 14 included in one group object 16, and inputs an operation of moving the two item objects 14 in directions away from each other, which evokes division, thereby dividing the group object 16 into two or three by a desired boundary. Therefore, the portable electronic apparatus 1 can realize division of the group object 16 by a more intuitive operation.

The portable electronic apparatus 1 according to the present embodiment can be applied to a portable electronic apparatus that has a Web browser capable of displaying a Web page, and that uses the Web browser to display an image corresponding to a search result for a Web page on a display device. In this case, the item object 14 is an image representing an URL. The group object 16 is an image surrounding a group of URLs extracted by the search. The portable electronic apparatus 1 displays these images on the display device 32. If an area in which one item object 14 is displayed is touched and selected, the portable electronic apparatus 1 acquires a Web page specified by the URL corresponding to the item object 14 thus selected by the communication unit 26, and displays the Web page on the display device 32.

Industrial Applicability

As described above, a communication apparatus, a portable electronic apparatus, and a control method for the portable electronic apparatus according to the present invention is suitable for organizing a plurality of objects by an intuitive operation performed by a user.

The invention claimed is:
1. A communication apparatus comprising:
a display configured to display an image;
an input detection device configured to detect contact with an area in which the image is displayed by the display as input;
a communication device configured to perform communications with another terminal; and
a control device configured to cause the display to display a plurality of item objects each corresponding to communication data and a group object surrounding the item objects, wherein
the input detection device detects first input of coming into contact with two different points in an area in which the group object is displayed and moving the contact with at least one of the two different points including a first point and a second point in a direction away from the other while maintaining the contact, the control device causes the display to display the item objects in an aligned manner based on information about data corresponding to the item objects in an alignment order in a direction in which a distance between the two points increases, the alignment order includes:
a first order when the first point stays and the second point moves away from the first point; and
a second order when the second point stays and the first point moves away from the second point, the second order being reverse from the first order,
the control device gradually arranges the item objects in the aligned manner as the distance between two points gradually increases such that randomness in the item objects is gradually reduced, and
the input detection device further detects input of coming into contact with an area in which one of the item objects is displayed at a single contact point, the control device causes the communication device to perform communication processing based on communication data associated with the item object.

2. A portable electronic apparatus comprising:
a display for displaying an image;
an input detection device for detecting contact with an area in which the image is displayed by the display as input; and
a control device for causing the display to display a plurality of item objects and a group object surrounding the item objects, wherein
the input detection device detects first input of coming into contact with two different points in an area in which the group object is displayed and moving the contact with at least one of the two different points including a first point and a second point in a direction away from the other while maintaining the contact, the control device causes the display to display the item objects in an aligned manner based on information about data corresponding to the item objects in an alignment order in a direction in which a distance between the two points increases,
the alignment order includes:
a first order when the first point stays and the second point moves away from the first point; and
a second order when the second point stays and the first point moves away from the second point, the second order being reverse from the first order, and
the control device gradually arranges the item objects in the aligned manner as the distance between two points gradually increases such that randomness in the item objects is gradually reduced.

3. The portable electronic apparatus according to claim 2, wherein the input detection device further detects the first input, the control device causes the display to display the group object such that a shape of the group object is extended in the direction in which the distance between the two different points increases, and shrinks in a direction perpendicular to the direction in which the distance between the two points increases.

4. The portable electronic apparatus according to claim 2, wherein the input detection device further detects the first input, the control device causes the display to display the item objects such that the item objects are aligned based on a predetermined standard and included in the group object.

5. The portable electronic apparatus according to claim 4, wherein the control device reverses an order of arrangement of the item objects between a case where contact with a first point that is one of the two different points is moved in a direction away from a second point that is the other of the two different points and a case where contact with the second point is moved in a direction away from the first point.

6. The portable electronic apparatus according to claim 4, wherein the control device rearranges the item objects based on different standards between a case where the direction in which the distance between the two different points increases is a first direction and a case where the direction is a second direction that is different from the first direction, and displays the item objects on the display such that the item objects are included in the group object.

7. The portable electronic apparatus according to claim 2, wherein the contact with the two different points is terminated in a state where the item objects are displayed on the display such that the item objects are aligned and included in the group object, and the input detection device further detects second input of coming into contact with areas in which two item objects adjacent to each other among the item objects are displayed and moving the contact in directions away from each other while maintaining the contact with the areas in which the item objects are displayed, the control device displays the group object in a manner divided into two by a boundary between the two item objects.

8. The portable electronic apparatus according to claim 7, wherein when displaying the group object in a divided manner, the control device causes the display to display the item objects without aligning the item objects.

9. The portable electronic apparatus according to claim 2, wherein the input detection device further detects a third input of coming into contact with areas in which a first item object and a second item object arranged with at least one item object interposed therebetween among the item objects are displayed in a state where the item objects are displayed in an aligned manner on the display, and moving the contact in directions away from each other while maintaining the contact with each of the item objects, the control device displays the group object in a manner divided into three of a first group object including the first item object, a second group object including the second item object, and an intermediate group object including the item object arranged intermediately by a first boundary between the first item object and the item object arranged intermediately and by a second boundary between the second item object and the item object arranged intermediately.

10. The portable electronic apparatus according to claim 2, wherein the input detection device further detects input of coming into contact with an area in which one of the item objects is displayed at a single contact point, the control device performs processing associated with the item object.

11. A control method for a portable electronic apparatus including a display that displays an image and an input detection device that detects contact with an area in which the image is displayed by the display, the control method comprising:
displaying a plurality of item objects and a group object surrounding the item objects on the display;
detecting, by the input detection device, first input of coming into contact with two different points in an area in which the group object is displayed and moving the contact with at least one of the two different points including a first point and a second point in a direction away from the other while maintaining touches to the two points; and
displaying, when the first input is detected, the item objects in an alignment order in an aligned manner based on information about data corresponding to the item objects in a direction in which a distance between the two points increases on the display, wherein
the alignment order includes:
a first order when the first point stays and the second point moves away from the first point; and a second order when the second point stays and the first point moves away from the second point, the second order being reverse from the first order, and gradually arranging the item objects in the aligned manner as the distance between two points gradually increases such that randomness in the item objects is gradually reduced.

12. A portable electronic apparatus comprising:
a display configured to display an image including a plurality of item objects;
an input detection device configured to detect contact with an area in which the image is displayed by the display and a position of the contact; and
a control device configured to cause, when the input detection device detects a first position of first contact and a second position of second contact at least one of which moves away from the other in the area, the control device causes the display to display the item objects in an alignment order in an aligned manner based on information about data corresponding to the item objects in a direction in which a distance between the first position and the second position increases,
wherein the control device gradually arranges the item objects in the aligned manner as the distance between two points including a first point and a second gradually increases such that randomness in the item objects is gradually reduced, and wherein the alignment order includes:
a first order when the first point stays and the second point moves away from the first point; and
a second order when the second point stays and the first point moves away from the second point, the second order being reverse from the first order.

13. The portable electronic apparatus according to claim 12, wherein the control device reverses an order of arrangement of the item objects between a case where the first position moves away from the second position and a case where the second position moves away from the first position.

14. The portable electronic apparatus according to claim 12, wherein the control device rearranges the item objects based on different standards between a case where the direction in which the distance between the first position and the second position increases is a first direction and a case where the direction is a second direction that is different from the first direction.

15. The portable electronic apparatus according to claim 12, wherein the input detection device further detects input of coming into contact with an area in which one of the item objects is displayed at a single contact point, the control device performs processing associated with the item object.

* * * * *